(12) United States Patent
Huskinson et al.

(10) Patent No.: US 10,847,829 B2
(45) Date of Patent: Nov. 24, 2020

(54) QUINONE AND HYDROQUINONE BASED FLOW BATTERY

(71) Applicant: President and Fellows of Harvard College, Cambridge, MA (US)

(72) Inventors: Brian Huskinson, Flower Mound, TX (US); Michael Marshak, Cambridge, MA (US); Michael J. Aziz, Concord, MA (US); Roy G. Gordon, Cambridge, MA (US); Alan Aspuru-Guzik, Cambridge, MA (US); Suleyman Er, Katwijk (NL); Changwon Suh, Centreville, VA (US); Liuchuan Tong, Cambridge, MA (US); Kaixiang Lin, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1000 days.

(21) Appl. No.: 15/025,040

(22) PCT Filed: Sep. 26, 2014

(86) PCT No.: PCT/US2014/057866
§ 371 (c)(1),
(2) Date: Mar. 25, 2016

(87) PCT Pub. No.: WO2015/048550
PCT Pub. Date: Apr. 2, 2015

(65) Prior Publication Data
US 2016/0248114 A1 Aug. 25, 2016

Related U.S. Application Data

(60) Provisional application No. 61/883,110, filed on Sep. 26, 2013.

(51) Int. Cl.
*H01M 8/18* (2006.01)
*H01M 8/04* (2016.01)
(Continued)

(52) U.S. Cl.
CPC ......... *H01M 8/188* (2013.01); *B29C 48/2528* (2019.02); *B29C 48/2886* (2019.02);
(Continued)

(58) Field of Classification Search
None
See application file for complete search history.

(56) References Cited

U.S. PATENT DOCUMENTS 3,238,066 A 3/1966 Klass et al.
3,288,641 A 11/1966 Rightmire
(Continued)

FOREIGN PATENT DOCUMENTS

CN 102035007 A 4/2011
CN 103000924 A 3/2013
(Continued)

OTHER PUBLICATIONS

Doherty, Redox Battery, Oct. 27, 2011, WO 2011/131959, pp. 1-123. (Year: 2011).*
(Continued)

*Primary Examiner* — Cynthia H Kelly
*Assistant Examiner* — Julian Anthony
(74) *Attorney, Agent, or Firm* — Clark & Elbing LLP

(57) ABSTRACT

The invention provides an electrochemical cell based on a new chemistry for a flow battery for large scale, e.g., gridscale, electrical energy storage. Electrical energy is stored chemically in quinone molecules having multiple oxidation states, e.g., three or more. During charging of the battery, the quinone molecules at one electrode are oxidized by emitting electrons and protons, and the quinone mol-
(Continued)

ecules at the other electrode are reduced by accepting electrons and protons. These reactions are reversed to deliver electrical energy. The invention also provides additional high and low potential quinones that are useful in rechargeable batteries.

9 Claims, 7 Drawing Sheets

(51) Int. Cl.
B29C 48/25 (2019.01)
B29C 48/285 (2019.01)
B29C 64/393 (2017.01)

(52) U.S. Cl.
CPC ....... B29C 64/393 (2017.08); H01M 2250/10 (2013.01); Y02B 90/14 (2013.01); Y02E 60/528 (2013.01)

(56) References Cited

U.S. PATENT DOCUMENTS

| | | | |
|---|---|---|---|
| 3,300,342 | A | 1/1967 | Klass |
| 4,578,323 | A | 3/1986 | Hertl et al. |
| 4,652,355 | A * | 3/1987 | Noding ............ C25B 3/00 204/238 |
| 6,020,105 | A | 2/2000 | Wariishi |
| 6,033,784 | A | 3/2000 | Jacobsen et al. |
| 9,966,622 | B2 | 5/2018 | Huskinson et al. |
| 2002/0088576 | A1 | 7/2002 | Andoh et al. |
| 2006/0194151 | A1 | 8/2006 | Inagaki et al. |
| 2007/0134520 | A1 | 6/2007 | Shimomura et al. |
| 2007/0184309 | A1 | 8/2007 | Gust, Jr. et al. |
| 2009/0017379 | A1 | 1/2009 | Inatomi et al. |
| 2009/0094822 | A1 | 4/2009 | Ohtsuka et al. |
| 2010/0112393 | A1 | 5/2010 | Knuckey et al. |
| 2011/0027624 | A1 | 2/2011 | Deane et al. |
| 2011/0189520 | A1 | 8/2011 | Carter et al. |
| 2011/0223450 | A1 | 9/2011 | Horne et al. |
| 2011/0284456 | A1 | 11/2011 | Brozell |
| 2014/0186731 | A1 | 7/2014 | Pham et al. |
| 2014/0370403 | A1* | 12/2014 | Narayan ............ H01M 8/188 429/418 |
| 2015/0079497 | A1 | 3/2015 | Lavastre et al. |
| 2015/0104724 | A1 | 4/2015 | Chang et al. |
| 2015/0176037 | A1 | 6/2015 | Amao et al. |
| 2015/0243991 | A1 | 8/2015 | Huskinson et al. |
| 2016/0043423 | A1 | 2/2016 | Huskinson et al. |
| 2016/0229803 | A1 | 8/2016 | Lin et al. |
| 2018/0048011 | A1 | 2/2018 | Aziz et al. |
| 2018/0219241 | A1 | 8/2018 | Chen et al. |

FOREIGN PATENT DOCUMENTS

| | | |
|---|---|---|
| JP | S62-73577 A | 4/1987 |
| JP | H0419966 A | 1/1992 |
| JP | H08185868 A | 7/1996 |
| JP | 2002-100398 A | 4/2002 |
| WO | WO-2006/129635 A1 | 12/2006 |
| WO | WO-2011/131959 A1 | 10/2011 |
| WO | WO-2014/052682 A2 | 4/2014 |
| WO | WO-2014/204985 A1 | 12/2014 |
| WO | WO-2016/144909 A1 | 9/2016 |
| WO | WO-2018/032003 A1 | 2/2018 |

OTHER PUBLICATIONS

Extended European Search Report for European Patent Application No. 14847588.2, dated Apr. 13, 2017 (8 pages).
PUBCHEM, Substance Record for SID 142148551, <https://pubchem.ncbi.nlm.nih.gov/substance/142148551#section=Top>, available date Aug. 20, 2012, retrieved Jun. 20, 2016 (6 pages).
Weber et al., "Redox flow batteries: a review," J Appl Electrochem 41:1137-64 (2011).
Xu et al., "A study of tiron in aqueous solutions for redox flow battery application," Electrochimica Acta. 55: 715-20 (2010).
Alt et al., "Evaluation of organic battery electrodes: voltammetric study of the redox behaviour of solid quinones," J Appl Electrochem. 2(3):193-200 (1972).
Borisova et al., "Simple Preparative Synthesis of Spinochrome E, a Pigment from Sea Urchins of the Genus Echinothrix," Chem Nat Comp. 48(2):202-4 (2012).
Chen et al., "A quinone-bromide flow battery with 1 W/cm2 power density," published in final form as: J Electrochem Soc. 163(1):A5010-3 (2016) (9 pages) (author manuscript).
Conant et al., "Free and total energy changes in the reduction of quinones," J Am Chem Soc. 44(11):2480-93 (1922).
Conant et al., "Reduction potentials of quinones. I. The effect of the solvent on the potentials of certain benzoquinones," J Am Chem Soc. 45(9):2194-218 (1923).
Conant et al., "Reduction potentials of quinones. II. The potentials of certain derivatives of benzoquinone, naphthoquinone and anthraquinone," J Am Chem Soc. 46(8):1858-1881 (1924).
Diaz, "Analytical applications of 1,10-anthraquinones: A review," Talanta. 38(6):571-88 (1991).
Er et al., "Computational design of molecules for an all-quinone redox flow battery," Chem Sci. 6(2):885-93 (2015).
Hori, Electrochemical CO2 reduction on metal electrodes. *Modern aspects of electrochemistry*. C. Vayenas et al., 89-189 (2008).
Hull et al., "Reversible hydrogen storage using CO2 and a proton-switchable iridium catalyst in aqueous media under mild temperatures and pressures," Nat Chem. 4(5):383-8 (2012).
Huskinson et al., "A metal-free organic-inorganic aqueous flow battery," Nature. 505(7482):195-8 (2014) (16 pages).
Huskinson et al., "Cycling of a quinone-bromide flow battery for large-scale electrochemical energy storage," published in final form as: ECS Trans. 61(37):27-30 (2014) (4 pages) (author manuscript).
Huskinson et al., "Novel quinone-based couples for flow batteries," published in final form as: ECS Trans. 53(7):101-5 (2013) (5 pages) (author manuscript).
International Search Report and Written Opinion for International Application No. PCT/US2014/057866, dated Dec. 30, 2014 (11 pages).
Li et al., "$CO_2$ reduction at low overpotential on Cu electrodes resulting from the reduction of thick $Cu_2O$ films," J Am Chem Soc. 134(17):7231-4 (2012).
Lin et al., "Alkaline quinone flow battery," Science. 349(6255):1529-32 (2015) (27 pages).
Nawar et al., "Benzoquinone-hydroquinone couple for flow battery," published in final form as: MRS Proceedings. 1491:mrsf12-1491 (2013) (6 pages) (author manuscript).
Rasmussen, "A single substance organic redox flow battery," ESS, 2012 (Poster presentation).
Wang et al., "Anthraquinone with tailored structure for a nonaqueous metal-organic redox flow battery," Chem Commun (Camb). 48(53):6669-71 (2012).
Xu et al., "Novel organic redox flow batteries using soluble quinonoid compounds as positive materials," IEEE. (4 pages) (2009).
Yao et al., "High-capacity organic positive-electrode material based on a benzoquinone derivative for use in rechargeable lithium batteries," J Power Sources. 195(24): 8336-40 (2010).
U.S. Appl. No. 16/324,951, Gordon et al.
EMD Millipore Corporation "Material Safety Data Sheet", Aug. 22, 2013 (9 pages).
Nielson et al., "Electron Self-Exchange Kinetics for a Water-Soluble Ferrocenium/Ferrocene Couple: Rate Modulation via Charge Dependent Calix[6]arene-p-sulfonate Encapsulation," Inorg Chem. 35(5):1402-4 (1996).

* cited by examiner

∧  
0.04 Volts vs SHE

∧  
1.05 Volts vs SHE

QUINONE AND HYDROQUINONE BASED FLOW BATTERY

CROSS-REFERENCE TO RELATED APPLICATIONS

This application claims benefit of U.S. Provisional Application No. 61/883,110, filed Sep. 26, 2013, which is hereby incorporated by reference.

STATEMENT REGARDING FEDERALLY SPONSORED RESEARCH

This invention was made with government support under grant number DE-AR0000348 from the Advanced Research Projects Agency—Energy—U.S. Department of Energy. The government has certain rights to the invention.

BACKGROUND OF THE INVENTION

Intermittent renewable electrical power sources such as wind and photovoltaics (PV) cannot replace a significant fraction of our current fossil fuel-based electrical generation unless the intermittency problem is solved. Fluctuations in renewable source power are generally backed up by natural gas fired "peaker" plants. Inexpensive, reliable energy storage at or near the generation site could render the renewable source dispatchable (e.g. demand-following). It could also permit full utilization of the transmission capacity of power lines from the generation site, permitting supply capacity expansion while deferring the need for transmission capacity expansion.

The advantages of flow batteries are giving them increased attention for grid-scale electrical storage (T. Nguyen and R. F. Savinell, *Electrochem. Soc. Int.* 19, 54 (2010)): because all of the reactants and products are stored in tanks outside the electrochemical conversion device, the device itself may be optimized for the required power while the required energy is independently determined by the mass of reactant and the size of storage tanks. This can drive down the storage cost per kWh, which is the single most challenging requirement for grid-scale storage. In contrast, in solid electrode batteries the energy/power ratio (i.e. the peak-power discharge time) does not scale and is inadequate for rendering intermittent renewable power sources dispatchable. Most solid-electrode batteries have peak-power discharge times <1 hr., whereas rendering PV and wind dispatchable require many hours to days (J. S. Rugolo and M. J. Aziz, *Energy & Env. Sci.* 5, 7151 (2012)).

By its nature the design of the zinc-bromine hybrid flow battery—involving Zn plating within the electrochemical conversion device—does not permit flow battery-like energy scaling; it also presents a dendrite-shorting risk (T. Nguyen and R. F. Savinell, *Electrochem. Soc. Int.* 19, 54 (2010)). Arguably the most developed flow battery technologies are vanadium redox flow batteries (VRBs) and sodium-sulfur batteries (NaSBs). Costs per kW are comparable, whereas VRBs are considerably more costly on a cost per kWh basis, in part due to the high price of vanadium, which sets a floor on the ultimate cost per kWh of a VRB (B. Dunn, H. Kamath, and J. M. Tarascon, *Science* 334, 928 (2011)). The vanadium itself costs around $160/kWh based on recent costs for $V_2O_5$ ("Mineral Commodity Summaries," U.S. Geological Survey, Reston, Va., 2012), p. 178). VRBs do benefit from a longer cycle life, with the ability to be cycled in excess of 10,000 times, whereas NaSBs are typically limited to about 4,500 cycles (B. Dunn, H. Kamath, and J. M. Tarascon, *Science* 334, 928 (2011)). For VRBs, costs per kW are likely to move lower, as recent improvements in VRB cell design have led to significantly higher power densities and current densities, with values of 1.4 $W/cm^2$ and 1.6 $A/cm^2$, respectively (M. L. Perry, R. M. Darling, and R. Zaffou, "High Power Density Redox Flow Battery Cells", *ECS Trans.* 53, 7, 2013), but these don't help lower the ultimate floor on the cost per kWh. These values, to our knowledge, represent the best performance achieved in VRBs reported to date in the literature. NaSBs have to operate above 300° C. to keep the reactants molten, which sets a floor on their operating costs. Over 100 MW of NaSBs have been installed on the grid in Japan, but this is due to government fiat rather than market forces. VRBs are the subject of aggressive development, whereas NaSBs represent a reasonably static target. There is also recent work on the regenerative electrolysis of hydrohalic acid to dihalogen and dihydrogen (V. Livshits, A. Ulus, and E. Peled, *Electrochem. Comm.* 8, 1358 (2006); T. V. Nguyen, H. Kreutzer, E. McFarland, N. Singh, H. Metiu, A. Ivanovskaya, and R.-F. Liu, *ECS Meeting Abstracts* 1201, 367 (2012); K. T. Cho, P. Albertus, V. Battaglia, A. Kojic, V. Srinivasan, and A. Z. Weber, "Optimization and Analysis of High-Power Hydrogen/Bromine-Flow Batteries for Grid-Scale Energy Storage", *Energy Technology* 1, 596 (2013); B. T. Huskinson, J. S. Rugolo, S. K. Mondal, and M. J. Aziz, arXiv: 1206.2883 [cond-mat.mtrl-sci]; *Energy & Environmental Science* 5, 8690 (2012)), where the halogen is chlorine or bromine. These systems have the potential for lower storage cost per kWh than VRBs due to the lower cost of the chemical reactants.

SUMMARY OF THE INVENTION

The invention provides an electrochemical cell based on a new chemistry for a flow battery for large scale, e.g., gridscale, electrical energy storage. Electrical energy is stored chemically at an electrochemical electrode by the protonation of small organic molecules called quinones to hydroquinones. The proton is provided by a complementary electrochemical reaction at the other electrode. These reactions are reversed to deliver electrical energy. A flow battery based on this concept can operate as a closed system. The flow battery architecture has scaling advantages over solid electrode batteries for large scale energy storage. Because quinone-to-hydroquinone cycling occurs rapidly and reversibly in photosynthesis, we expect to be able to employ it to obtain high current density, high efficiency, and long lifetime in a flow battery. High current density drives down power-related costs. The other advantages this particular technology would have over other flow batteries include inexpensive chemicals, energy storage in the form of safer liquids, an inexpensive separator, little or no precious metals usage in the electrodes, and other components made of plastic or inexpensive metals with coatings proven to afford corrosion protection.

Variations of a quinone-based cell are described. In one aspect, the invention provides rechargeable battery having first and second electrodes, wherein in its charged state, the battery includes an oxidized form of a quinone having three or more oxidation states dissolved or suspended in aqueous solution in contact with the first electrode and a reduced form of the quinone having three or more oxidation states dissolved or suspended in aqueous solution in contact with the second electrode, wherein during discharge the oxidized form of the quinone is reduced at the first electrode and the reduced form of the quinone is oxidized at the second electrode. In certain embodiments, the quinone is a water-soluble anthraquinone. In other embodiments, the first and second electrodes are separated by an ion conducting barrier, e.g., a porous physical barrier or a size exclusion barrier. Exemplary quinones are of the formula:

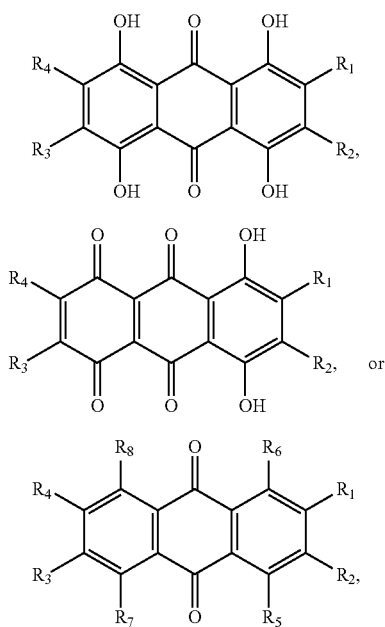

wherein each of $R_1$-$R_8$ (i.e., $R_1$-$R_4$ for formula A and B) is independently selected from H, optionally substituted $C_{1-6}$ alkyl, halo, hydroxy, optionally substituted $C_{1-6}$ alkoxy, $SO_3H$, amino, nitro, carboxyl, phosphoryl, phosphonyl, thiol, carboxyl, optionally substituted $C_{1-6}$ alkyl ester, optionally substituted $C_{1-6}$ alkyl thio, and oxo, or an ion thereof. Preferably, at least one of $R_1$-$R_8$ (i.e., $R_1$-$R_4$ for formula A and B) is not H.

Specific examples of quinones include

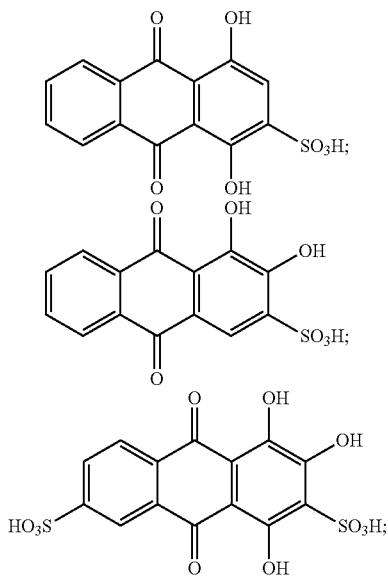

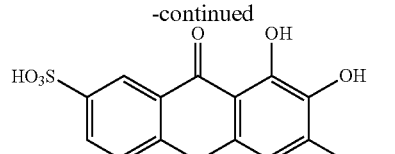

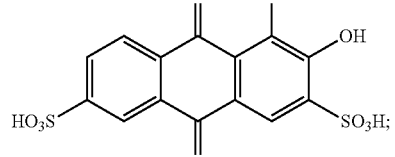

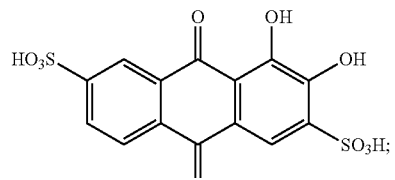

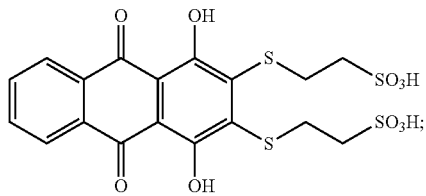

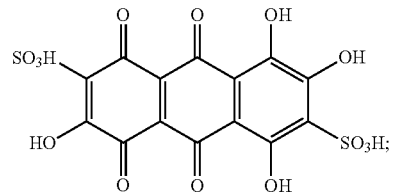

or an ion thereof.

The battery may also include reservoirs for the oxidized and reduced forms of the quinone dissolved or suspended in aqueous solution and a mechanism to circulate the solutions, e.g., a pump.

In another embodiment, the invention provides a rechargeable battery having first and second electrodes, wherein in its charged state, the battery includes a first redox active species in contact with the first electrode and a second redox active species in contact with the second electrode, wherein the first redox active species is a quinone dissolved or suspended in aqueous solution and during discharge the quinone is reduced at the first electrode and/or the second redox active species is a hydroquinone dissolved or suspended in aqueous solution and during discharge the hydroquinone oxidized at the second electrode, wherein the quinone or hydroquinone in oxidized form is selected from a compound of formula (a)-(qq), in particular formula (k), (n), or (t):

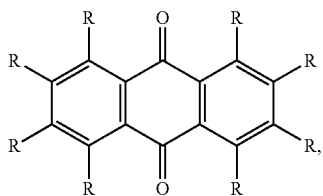

(k)

wherein each R is independently H, NH$_2$, OH, PO$_3$H$_2$, or SO$_3$H, but not all are H;

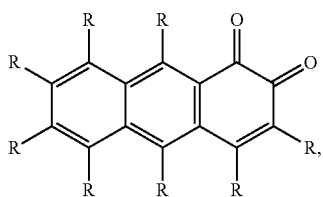

(n)

wherein each R is independently H, NH$_2$ or OH, but not all are H;

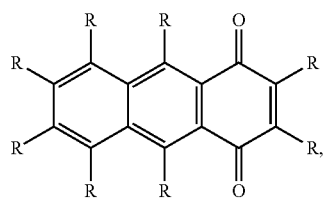

(t)

wherein each R is independently H, NH$_2$ or OH, but not all are H.

In another aspect, the invention provides a rechargeable battery having first and second electrodes, wherein in its charged state, the battery includes a first redox active species in contact with the first electrode and a second redox active species in contact with the second electrode, wherein the first redox active species is a quinone selected from Table 2, provided herein, dissolved or suspended in aqueous solution and during discharge the quinone is reduced at the first electrode and/or the second redox active species is a hydroquinone derived from a quinone selected from Table 1, provided herein, dissolved or suspended in aqueous solution and during discharge the hydroquinone oxidized at the second electrode.

In rechargeable batteries including a quinone of formulas (a)-(qq), Table 1, or Table 2, the first and second electrodes may be separated by an ion conducting barrier, e.g., a porous physical barrier or a size exclusion barrier.

When a first or second redox active species is not of Table 1 or 2 or of formula (a)-(qq), it may be another quinone or hydroquinone. Such quinones and hydroquinones are described in International Publication No. WO 2014/052682.

Any rechargeable battery of the invention may further include a reservoir for quinone and/or hydroquinone dissolved or suspended in aqueous solution and a mechanism to circulate quinone and/or hydroquinone, e.g., a pump. In particular embodiments, the rechargeable battery is a flow battery.

The invention also provides methods for storing electrical energy by applying a voltage across the first and second electrodes and charging any battery of the invention.

The invention also provides methods for providing electrical energy by connecting a load to the first and second electrodes and allowing any battery of the invention to discharge.

The invention also features any quinone as described herein, e.g., a quinone of formula (A)-(C), Example 2-7, formulas (a)-(qq), Table 1, or Table 2.

The absence of active metal components in both redox chemistry and catalysis represents a significant shift away from modern batteries. In particular, the use of quinones, such as 9,10-anthraquinone-2,7-disulfonate, offers several advantages over current flow battery technologies:

(1) Scalability: it contains the earth-abundant atoms, such as carbon, sulfur, hydrogen and oxygen, and can be inexpensively manufactured on large scales. Because some quinones are natural products, there is also the possibility that the electrolyte material can be renewably sourced.

(2) Kinetics: it undergoes rapid two-electron redox on simple carbon electrodes and does not require a costly precious metal catalyst.

(3) Stability: the quinone should exhibit minimal membrane crossover because of its relatively large size and potential for a dianionic state.

(4) Solubility: it has a solubility of order 1 M at pH 0 and can be stored at relatively high energy densities.

(5) Tunability: The reduction potential and solubility of quinones can be further optimized by introduction of electron-donating functional groups such as —OH or electron-withdrawing functional groups such as —SO$_3$H.

These features lower the capital cost of storage chemicals per kWh, which sets a floor on the ultimate system cost per kWh at any scale. Optimization of engineering and operating parameters such as the flow field geometry, electrode design, membrane separator, and temperature should lead to significant performance improvements in the future, as it has for vanadium flow batteries, which took many years to surpass 100 mW cm$^{-2}$. The use of quinones represents a new and promising direction for cost-effective, large-scale energy storage.

For the purposes of this invention, the term "quinone" includes a compound having one or more conjugated, C$_{3-10}$ carbocyclic, fused rings, substituted, in oxidized form, with two or more oxo groups, which are in conjugation with the one or more conjugated rings. Preferably, the number of rings is from one to ten, e.g., one, two, or three, and each ring has 6 members.

By "alkyl" is meant straight chain or branched saturated groups from 1 to 6 carbons. Alkyl groups are exemplified by methyl, ethyl, n- and iso-propyl, n-, sec-, iso- and tert-butyl, neopentyl, and the like, and may be optionally substituted with one, two, three, or, in the case of alkyl groups of two carbons or more, four substituents independently selected from the group consisting of halo, hydroxyl, C$_{1-6}$ alkoxy, SO$_3$H, amino, nitro, carboxyl, phosphoryl, phosphonyl, thiol, C$_{1-6}$ alkyl ester, optionally substituted C$_{1-6}$ alkyl thio, and oxo, or an ion thereof.

By "alkoxy" is meant a group of formula —OR, wherein R is an alkyl group, as defined herein.

By "alkyl thio" is meant —S—R, where R is an alkyl group, as defined herein.

By "alkyl ester" is meant —COOR, where R is an alkyl group, as defined herein.

By "halo" is meant, fluoro, chloro, bromo, or iodo.
By "hydroxyl" is meant —OH.
By "amino" is meant —NH$_2$. An exemplary ion of amino is —NH$_3^+$.
By "nitro" is meant —NO$_2$.
By "carboxyl" is meant —COOH. An exemplary ion of carboxyl, is —COO$^-$.
By "phosphoryl" is meant —PO$_3$H$_2$. Exemplary ions of phosphoryl are —PO$_3$H$^-$ and —PO$_3^{2-}$.
By "phosphonyl" is meant —PO$_3$R$_2$, wherein each R is H or alkyl, provided at least one R is alkyl, as defined herein. An exemplary ion of phosphoryl is —PO$_3$R$^-$.
By "oxo" is meant =O.
By "sulfonyl" is meant —SO$_3$H. An exemplary ion of sulfonyl is —SO$_3^-$.
By "thiol" is meant —SH.

DETAILED DESCRIPTION OF THE INVENTION

Figure 1:
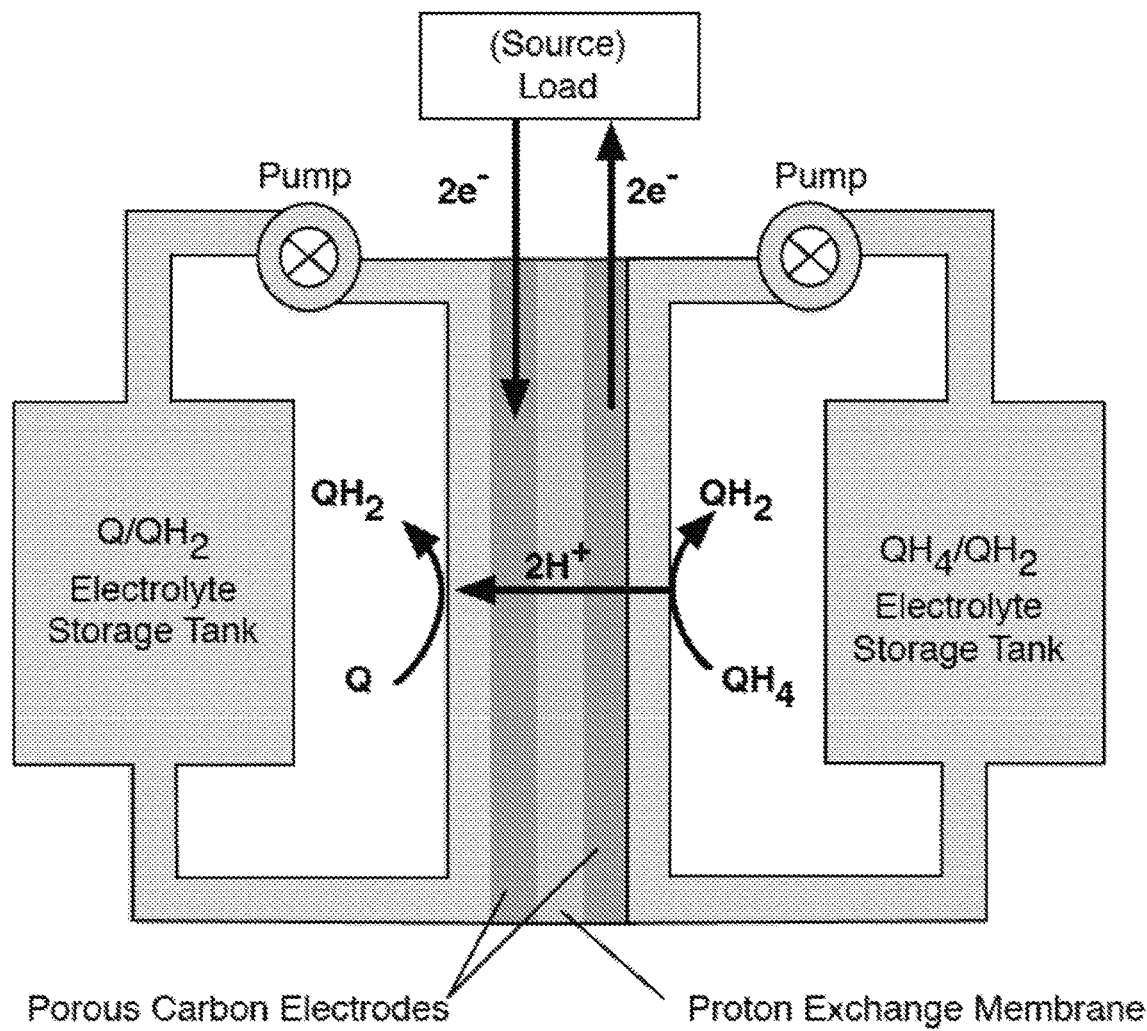
FIG. 1 is a scheme of a battery having a quinone on both sides of the cell, where the quinone has three oxidation states represented by Q, QH$_2$, and QH$_4$.

The invention provides rechargeable batteries employing quinones or hydroquinones as redox active species. Preferably, the battery employs a quinone on both sides of the cell. In one embodiment, the quinone has multiple oxidation states, e.g., three, allowing the same quinone framework to be employed on both sides of the cell. Such arrangements are beneficial in mitigating the effects of cross over contamination, as the quinones on both sides are the same molecule or can be oxidized or reduced to be the same molecule. An exemplary scheme of a cell employing quinones having three oxidation states on both sides of the cell is shown in FIG. 1. During discharge, Q is reduced to QH$_2$ on one side of the cell, and QH$_4$ is oxidized to QH$_2$ on the other side of the cell, where Q represents the same quinone framework. Thus, QH$_4$ is considered a reduced form of the quinone, and Q is considered an oxidized form of the quinone. It will be understood that the two sides of the cell will not cycle between the same two oxidation states. R and X represent different substituents or different positions of substituents or different combinations of substituents, and the quinones on both sides may have the same or differing numbers of rings.

Figure 2:
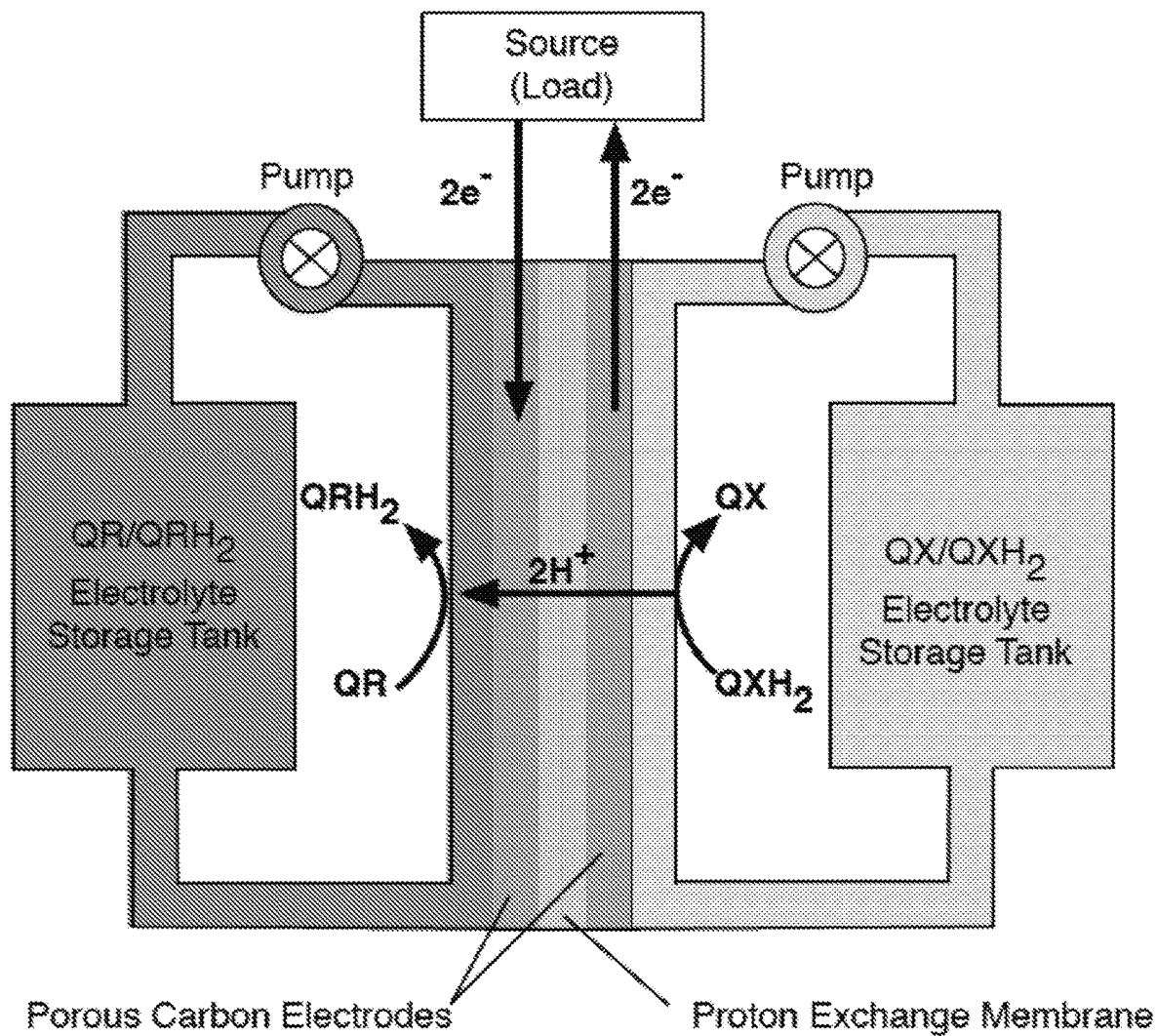
FIG. 2 is scheme of a battery having different quinones on each side of the cell.

In another embodiment, the invention provides quinones or hydroquinones for use in a rechargeable battery, which may be employed with or without another quinone on the other side of the cell. An exemplary scheme of a cell employing different quinones on each side of the cell is shown in FIG. 2. During charging, QR is reduced to QRH$_2$, and QXH$_2$ is oxidized to QX, where QR and QX are quinones having different frameworks.

The invention points the way to a high efficiency, long cycle life redox flow battery with reasonable power cost, low energy cost, and all the energy scaling advantages of a flow battery. In some embodiments, the separator can be a cheap hydrocarbon instead of a fluorocarbon, and reactant crossover will be negligible. In other embodiments, the separator can be a porous physical barrier instead of an ion-selective membrane. The electrodes can be inexpensive conductors, conformally coated with a layer of active material so thin as to be negligible in cost (B. T. Huskinson, J. S. Rugolo, S. K. Mondal, and M. J. Aziz, arXiv:1206.2883 [cond-mat.mtrl-sci]; *Energy & Environmental Science* 5, 8690 (2012)). Many of the structural components can be made of cheap plastic, and components that need to be conducting can be protected with conformally coated ultrathin films. Chemical storage can be in the form of cheap, flowing liquids held in cheap plastic tanks and require neither compression nor heating above the liquid's boiling point. Quinone-to-hydroquinone cycling occurs rapidly and reversibly and provides high current density (high current density is very important because the cost per kW of the system is typically dominated by the electrochemical stack's cost per kW, which is inversely proportional to the power density—the product of current density and voltage), high efficiency, and long lifetime in a flow battery. There are many structures that can be readily screened computationally and synthesized. For example, quinone candidates with high redox potential and candidates with low redox potential, along with other desirable attributes can be identified based on computation screens. In one embodiment, a full cell includes a high redox potential quinone/hydroquinone couple vs. a low redox potential quinone/hydroquinone couple. A performance target is 80% round-trip efficiency in each cell at 0.25 W/cm$^2$. In another embodiment, the full cell includes a quinone that operates between two different oxidation states on the positive electrode, and between two oxidation states on the negative electrode where at least one of the oxidation states is different from those on the positive electrode.

The quinone to hydroquinone reduction reaction consists of converting an oxygen that is doubly bonded ("=O") to an sp$^2$ C$_6$ ring into a singly-bonded hydroxyl ("—OH"). An electrode contributes an electron as the acidic electrolyte provides the proton. This typically occurs with pairs of oxygens in the ortho or para configurations; in acidic aqueous solutions the two oxygen sites undergo the reaction at potentials that are virtually indistinguishable. The transition from the hydroquinone to the quinone involves simply removing protons and the electrons that bind them to the oxygens without disrupting the rest of the bonding, so these molecules are exceedingly stable, and the kinetics are very rapid. The first concern we have in creating a quinone-based flow battery is selecting a quinone with the appropriate value of the redox potential. In aqueous solutions the positive electrode cannot operate at voltages above about 1.5 V vs. Standard Hydrogen Electrode (SHE) or else $O_2$ evolution becomes significant. The negative electrode cannot operate at voltages below about −0.2 V to 0 V (depending on electrocatalyst) vs. SHE or else $H_2$ evolution becomes significant.

In addition to redox potential, important molecular characteristics include solubility, stability, redox kinetics, toxicity, and potential or current market price. High solubility is important because the mass transport limitation at high current density in a full cell is directly proportional to the solubility. Solubility can be enhanced by attaching polar groups such as the sulfonic acid groups. Stability is important not only to prevent chemical loss for long cycle life, but also because polymerization on the electrode can compromise the electrode's effectiveness. Stability against water and polymerization can be enhanced by replacing vulnerable C—H groups adjacent to C=O groups with more stable groups such as C—R, where R is optionally substituted $C_{1-6}$ alkyl, hydroxy, optionally substituted $C_{1-6}$ alkoxy, $SO_3H$, amino, nitro, carboxyl, phosphoryl, or phosphonyl.

Quinones having multiple oxidation states include:

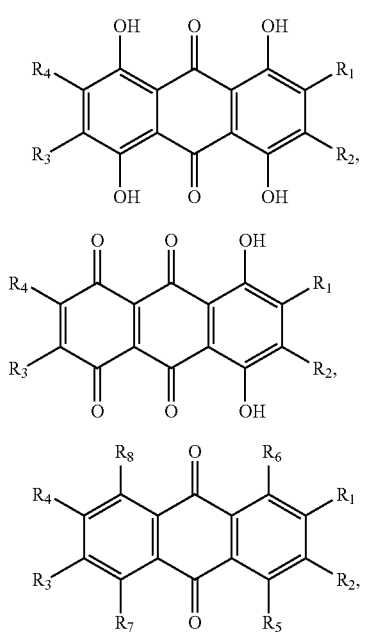

wherein each of $R_1$-$R_8$ is independently selected from H, optionally substituted $C_{1-6}$ alkyl, halo, hydroxy, optionally substituted $C_{1-6}$ alkoxy, $SO_3H$, amino, nitro, carboxyl, phosphoryl, phosphonyl, thiol, carboxyl, optionally substituted $C_{1-6}$ alkyl ester, optionally substituted $C_{1-6}$ alkyl thio, and oxo, or an ion thereof. The double bonds within the rings represent full conjugation of the ring system. It will understood that when one or more of $R_1$-$R_8$ is oxo, the number of the double bonds within the ring will be reduced, and the depicted double bond location may change. Specific compounds are provided in the Examples.

Specific hydroxyquinones useful at the anode during discharge are derived from quinones shown in Table 1. The numbering for Table 1 is as follows:

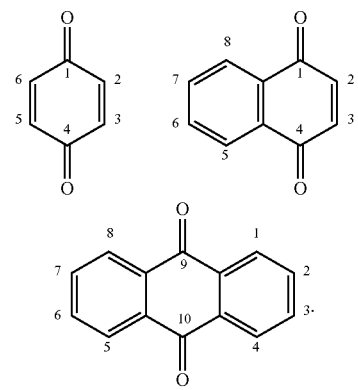

Numbering convention

TABLE 1

| ID | Class | R-group substituted | Position of substituted R-group | $G^0_{solv}$ (kJmol$^{-1}$) | $E^0$ (V vs. SHE) |
|---|---|---|---|---|---|
| 1 | 9,10-AQ | OH | Full | −92.83 | −0.81 |
| 2 | 1,5-AQ | OH | Full | −103.41 | −0.75 |
| 3 | 1,10-AQ | OH | Full | −103.53 | −0.75 |
| 4 | 1,4-AQ | OH | Full | −92.67 | −0.74 |
| 5 | 2,3-AQ | OH | Full | −92.66 | −0.69 |
| 6 | 9,10-AQ | $NH_2$ | Full | −127.84 | −0.51 |
| 7 | 1,4-AQ | $NH_2$ | Full | −125.38 | −0.39 |
| 8 | 1,10-AQ | $NH_2$ | Full | −126.65 | −0.37 |
| 9 | 2,9-AQ | $NH_2$ | Full | −127.01 | −0.35 |
| 10 | 1,5-AQ | $NH_2$ | Full | −131.98 | −0.34 |
| 11 | 2,6-AQ | $NH_2$ | Full | −126.90 | −0.32 |
| 12 | 1,7-AQ | $NH_2$ | Full | −129.44 | −0.30 |
| 13 | 2,9-AQ | OH | Full | −107.10 | −0.29 |
| 14 | 1,5-NQ | $NH_2$ | Full | −106.22 | −0.26 |
| 15 | 1,4-NQ | $NH_2$ | Full | −105.60 | −0.22 |
| 16 | 2,6-NQ | $NH_2$ | Full | −100.88 | −0.18 |
| 17 | 1,7-NQ | $NH_2$ | Full | −104.51 | −0.09 |
| 18 | 1,10-AQ | $PO_3H_2$ | Full | −306.07 | −0.08 |
| 19 | 1,2-AQ | OH | Full | −145.40 | −0.08 |
| 20 | 2,6-AQ | OH | Full | −110.54 | −0.07 |
| 21 | 1,7-AQ | OH | Full | −151.92 | −0.03 |
| 22 | 1,4-NQ | OH | Full | −106.88 | −0.02 |
| 23 | 1,7-NQ | OH | Full | −81.74 | −0.01 |
| 24 | 1,2-AQ | $NH_2$ | Full | −151.34 | 0.02 |
| 25 | 2,9-AQ | $PO_3H_2$ | Full | −206.50 | 0.03 |
| 26 | 1,2-NQ | OH | Full | −100.13 | 0.04 |
| 27 | 2,9-AQ | $SO_3H$ | Full | −113.61 | 0.09 |
| 28 | 9,10-AQ | $SO_3H$ | Full | −102.71 | 0.11 |
| 29 | 2,3-AQ | $PO_3H_2$ | Full | −242.19 | 0.13 |
| 30 | 1,2-NQ | $NH_2$ | Full | −130.08 | 0.17 |
| 31 | 9,10-AQ | COOH | Full | −197.31 | 0.18 | or an ion thereof, wherein AQ is anthraquinone, and NQ is naphthoquinone. It will be understood that the points of substitution listed in the Class correspond to the location of oxo groups. "Full" substitution denotes the presence of the listed R group at every ring position not having an oxo group. In other embodiments, the quinone is a 1,2-; 1,4-; 1,5-; 1,7-; 1,10-; 2,3-; 2,6-; 2,9-; or 9,10-AQ substituted with at least one of hydroxyl, amino, phosphoryl, —$SO_3H$, carboxyl, or an ion thereof. In other embodiments, the quinone is a 1,2-; 1,4-; 1,5-; 1,7-; or 2,6-NQ substituted with at least one of hydroxyl, amino, phosphoryl, —$SO_3H$, carboxyl, or an ion thereof.

Specific quinones useful at the cathode during discharge are in shown Table 2. The numbering is the same as for Table 1.

TABLE 2

| ID | Class | R-group substituted | Position of substituted R-group | $G^0_{solv}$ (kJmol$^{-1}$) | $E^0$ (V vs. SHE) |
|---|---|---|---|---|---|
| 1 | 2,3-AQ | SO$_3$H | R4 | −97.32 | 1.01 |
| 2 | 1,4-BQ | PO$_3$H$_2$ | Full | −142.99 | 1.02 |
| 3 | 2,3-NQ | PO$_3$H$_2$ | R6 | −90.20 | 1.02 |
| 4 | 1,5-AQ | PO$_3$H$_2$ | Full | −262.40 | 1.07 |
| 5 | 2,3-NQ | SO$_3$H | Full | −151.95 | 1.08 |
| 6 | 2,3-AQ | NH$_2$ | R5 | −106.45 | 1.08 |
| 7 | 2,3-AQ | SH | R6 | −143.02 | 1.09 |
| 8 | 2,6-AQ | COOCH$_3$ | Full | −88.41 | 1.09 |
| 9 | 2,3-AQ | PO$_3$H$_2$ | R4 | −82.21 | 1.09 |
| 10 | 2,3-AQ | OH | R10 | −87.13 | 1.10 |
| 11 | 2,6-NQ | COOH | Full | −166.86 | 1.10 |
| 12 | 2,3-NQ | PO$_3$H$_2$ | R5 | −90.31 | 1.10 |
| 13 | 1,2-BQ | COOH | Full | −107.66 | 1.12 |
| 14 | 2,3-AQ | OH | R5 | −85.42 | 1.12 |
| 15 | 1,7-AQ | SO$_3$H | Full | −160.06 | 1.13 |
| 16 | 2,3-AQ | SO$_3$H | R5 | −84.20 | 1.15 |
| 17 | 2,3-AQ | PO$_3$H$_2$ | R6 | −95.90 | 1.15 |
| 18 | 2,6-AQ | COOH | Full | −218.30 | 1.16 |
| 19 | 1,5-NQ | SO$_3$H | Full | −196.21 | 1.18 |
| 20 | 2,3-AQ | PO$_3$H$_2$ | R5 | −97.33 | 1.19 |
| 21 | 1,7-NQ | COOH | Full | −163.40 | 1.21 |
| 22 | 1,2-BQ | PO$_3$H$_2$ | Full | −168.34 | 1.23 |
| 23 | 2,6-AQ | SO$_3$H | Full | −152.43 | 1.27 |
| 24 | 2,3-AQ | PO$_3$H$_2$ | R10 | −90.17 | 1.27 |
| 25 | 2,3-NQ | COOH | Full | −152.58 | 1.30 |
| 26 | 1,4-BQ | SO$_3$H | Full | −96.55 | 1.32 |
| 27 | 2,6-AQ | CHO | Full | −92.83 | 1.40 |
| 28 | 1,5-AQ | SO$_3$H | Full | −191.41 | 1.64 | or an ion thereof, wherein BQ is benzoquinone, AQ is anthraquinone, and NQ is naphthoquinone. It will be understood that the points of substitution listed in the Class correspond to the location of oxo groups. "Full" substitution denotes the presence of the listed R group at every ring position not having an oxo group. For quinones with other than full substitution, the remaining ring positions are bound to H. In other embodiments, the quinone is a 1,2- or 1,4-BQ substituted with at least one of hydroxyl, amino, phosphoryl, —SO$_3$H, thiol, C$_{1-6}$ alkyl ester, carboxyl, —CHO, or an ion thereof. In other embodiments, the quinone is a 1,5-; 1,7-; 2,3-; or 2,6-AQ substituted with at least one of hydroxyl, amino, phosphoryl, —SO$_3$H, thiol, C$_{1-6}$ alkyl ester, carboxyl, —CHO, or an ion thereof. In other embodiments, the quinone is a 1,5-; 1,7-; 2,3-; or 2,6-NQ substituted with at least one of hydroxyl, amino, phosphoryl, —SO$_3$H, thiol, C$_{1-6}$ alkyl ester, carboxyl, —CHO, or an ion thereof.

Other quinones for use in a rechargeable battery are of formula (a)-(qq)

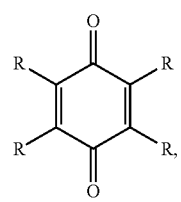

(a)

wherein each R is independently H, NH$_2$ or OH, but not all are H;

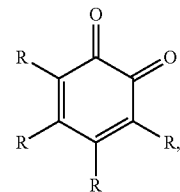

(b)

wherein each R is NH$_2$;

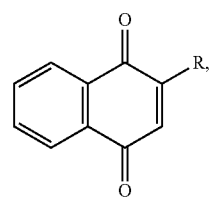

(c)

wherein R is NH$_2$ or OH;

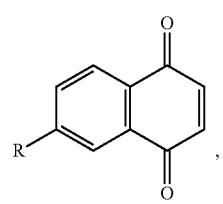

(d)

wherein R is NH$_2$ or OH;

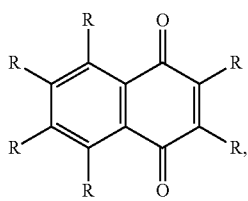

(e)

wherein each R is independently NH$_2$ or OH;

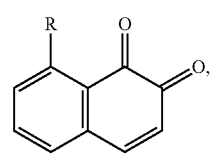

(f)

wherein R is NH$_2$ or OH;

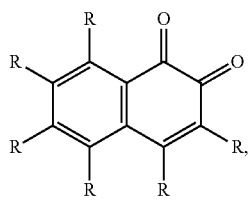
(g)
wherein each R is independently NH$_2$ or OH;
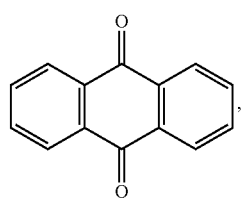
(h)
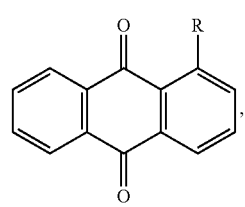
(i)
wherein R is NH$_2$, OH, PO$_3$H$_2$, or SO$_3$H;
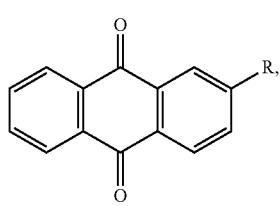
(j)
wherein R is NH$_2$, OH, PO$_3$H$_2$, or SO$_3$H;
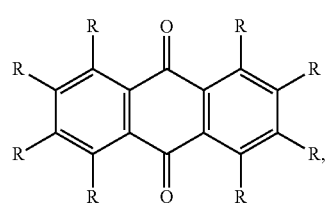
(k)
wherein each R is independently H, NH$_2$, OH, PO$_3$H$_2$, or SO$_3$H, but not all are H;
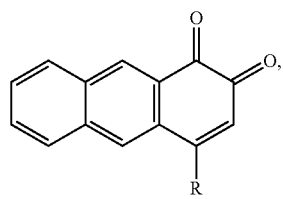
(l)
wherein R is NH$_2$ or OH;
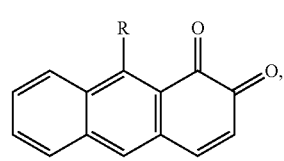
(m)
wherein R is NH$_2$ or OH;
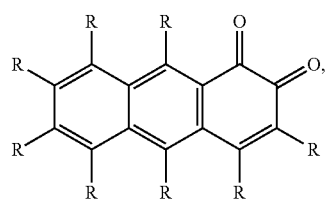
(n)
wherein each R is independently H, NH$_2$, OH, PO$_3$H$_2$, or SO$_3$H, but not all are H;
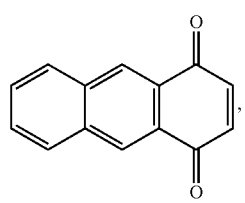
(o)
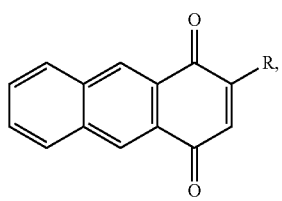
(p)
wherein R is NH$_2$, OH, or PO$_3$H$_2$;

(q)

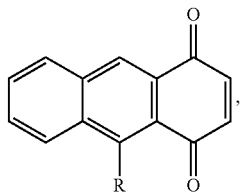

wherein R is NH$_2$, OH, PO$_3$H$_2$, or SO$_3$H;

(r)

wherein R is NH$_2$, OH, or SO$_3$H;

(s)

wherein R is NH$_2$, OH, or SO$_3$H;

(t)

wherein each R is independently H, NH$_2$, OH, PO$_3$H$_2$, or SO$_3$H, but not all are H;

(u)

(v)

wherein R is PO$_3$H$_2$ or SO$_3$H;

(w)

wherein each R is independently PO$_3$H$_2$ or SO$_3$H;

(x)

(y)

wherein R is NH$_2$, OH, PO$_3$H$_2$, or SO$_3$H;

(z)

wherein R is NH$_2$, OH, PO$_3$H$_2$, or SO$_3$H;

(aa)

wherein each R is independently H, PO$_3$H$_2$ or SO$_3$H, but not all are H;

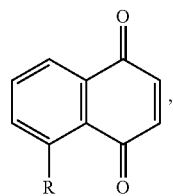
wherein R is NH₂ or OH;
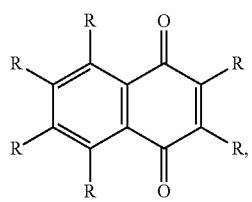
wherein each R is independently H, PO₃H₂ or SO₃H, but not all are H;
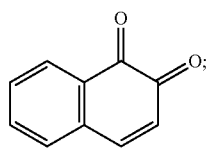
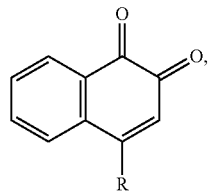
wherein R is PO₃H₂ or SO₃H;
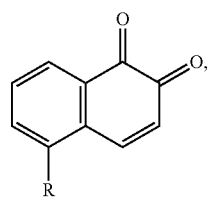
wherein R is NH₂ or OH;
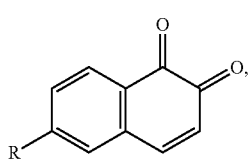
wherein R is PO₃H₂ or SO₃H;
(bb)
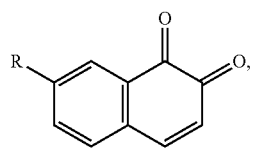
wherein R is PO₃H₂ or SO₃H;
(cc)
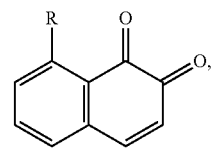
wherein R is PO₃H₂ or SO₃H;
(dd)
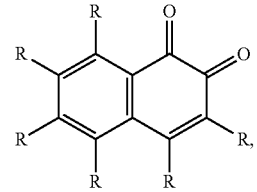
wherein R is SO₃H;
(ee)
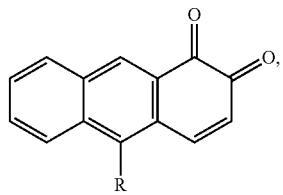
wherein R is PO₃H₂;
(ff)
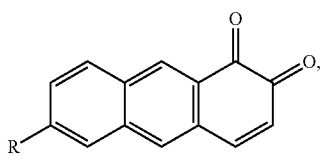
wherein R is PO₃H₂;
(gg)
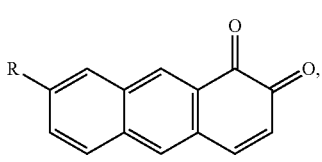
wherein R is PO₃H₂;
(hh)
(ii)
(jj)
(kk)
(ll)
(mm)

(nn)

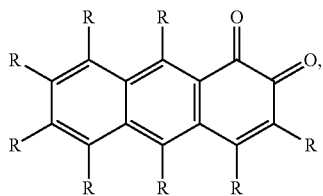

wherein each R is independently H, PO$_3$H$_2$ or SO$_3$H, but not all are H;

(oo)

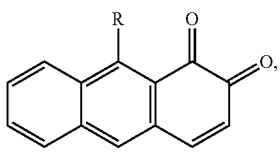

wherein R is PO$_3$H$_2$;

(pp)

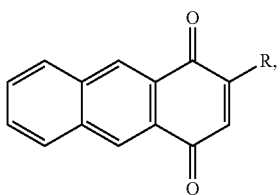

wherein R is SO$_3$H; and (qq)

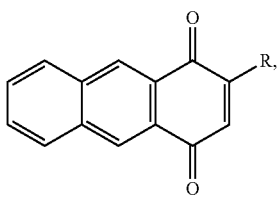

wherein each R is SO$_3$H, or an ion thereof.

Particularly preferred quinones are of formulas (k), (n), and (t).

It is also understood that quinones substituted with —PO$_3$H$_2$, —COOH, or —SO$_3$H groups may exist in solution as anions, such as quinone-PO$_3$H$^-$, quinone-COO$^-$, or quinone-SO$_3$$^-$, or neutrals, such as quinone-PO$_3$H$_2$. It is also understood that they may exist as ion-paired salts, such as quinone-PO$_3$HNa, quinone-COONa, or quinone-SO$_3$Na, or as separate ions, such as Na+ and quinone-PO$_3$H$^-$, quinone-COO$^-$, or quinone-SO$_3$$^-$. It is also understood that quinones substituted with —NH$_2$ groups may exist in solution as quinone-NH$_3$$^+$ ions or as salts, such as quinone-NH$_3$Cl.

Other quinones and hydroquinones that may employed with quinones and hydroquinones of Tables 1 and 2 and formulas (a)-(qq) include those in International Publication No. WO 2014/052682, e.g., a quinone of formulas (A)-(D), (I)-(VII), Table 3, or Table 4 of this reference.

Quinones or hydroquinones may be present in a mixture. For example, a mixture of sulfonated quinones can be produced by reacting sulfuric acid with an anthraquinone, e.g., 9,10-anthraquinone.

Quinones may be dissolved or suspended in aqueous solution in the batteries. The concentration of the quinone ranges, for example, from 0.1 M to liquid quinone, e.g., 0.1-15 M. In addition to water, solutions may include alcohols (e.g., methyl, ethyl, or propyl) and other co-solvents to increase the solubility of a particular quinone. In some embodiments, the solution of quinone is at least 10%, 20%, 30%, 40%, 50%, 60%, 70%, or 80% water, by mass. Alcohol or other co-solvents may be present in an amount required to result in a particular concentration of quinone. The pH of the aqueous solution for a quinone may also be adjusted by addition of acid or base, e.g., to aid in solubilizing a quinone.

Although a battery using a quinone on both sides is preferable, quinones may be employed on only one side in conjunction with another redox active species, e.g., bromine, chlorine, iodine, oxygen, vanadium, chromium, cobalt, iron, manganese, cobalt, nickel, copper, or lead, e.g., a manganese oxide, a cobalt oxide or a lead oxide.

Electrode Materials

Electrode materials can be screened for good molecule-specific electrode kinetics. Although evidence indicates that quinone/hydroquinone catalysis is not a significant barrier, some electrode materials are expected to become deactivated due to the chemisorption of molecules or fragments, or the polymerization of reactants. Electrodes for use with a quinone or hydroquinone include any carbon electrode, e.g., glassy carbon electrodes, carbon paper electrodes, carbon felt electrodes, or carbon nanotube electrodes. Titanium electrodes may also be employed. Electrodes suitable for other redox active species are known in the art.

The fabrication of full cells requires the selection of appropriate electrodes. Electrodes can be made of a high specific surface area conducting material, such as nanoporous metal sponge (T. Wada, A. D. Setyawan, K. Yubuta, and H. Kato, *Scripta Materialia* 65, 532 (2011)), which has synthesized previously by electrochemical dealloying (J. D. Erlebacher, M. J. Aziz, A. Karma, N. Dmitrov, and K. Sieradzki, *Nature* 410, 450 (2001)), or conducting metal oxide, which has been synthesized by wet chemical methods (B. T. Huskinson, J. S. Rugolo, S. K. Mondal, and M. J. Aziz, arXiv:1206.2883 [cond-mat.mtrl-sci]; *Energy & Environmental Science* 5, 8690 (2012); S. K. Mondal, J. S. Rugolo, and M. J. Aziz, *Mater. Res. Soc. Symp. Proc.* 1311, GG10.9 (2010)). Chemical vapor deposition can be used for conformal coatings of complex 3D electrode geometries by ultra-thin electrocatalyst films.

Fabrication of Testing Hardware and Cell Testing

The balance of system around the cell will include fluid handling and storage, and voltage and round-trip energy efficiency measurements can be made. Systems instrumented for measurement of catholyte and anolyte flows and pH, pressure, temperature, current density and cell voltage may be included and used to evaluate cells. Testing can be performed as reactant and acid concentrations and the cell temperature are varied. In one series of tests, the current density is measured at which the voltage efficiency drops to 90%. In another, the round-trip efficiency is evaluated by charging and discharging the same number of amp-minutes while tracking the voltage in order to determine the energy conversion efficiency. This is done initially at low current density, and the current density is then systematically increased until the round-trip efficiency drops below 80%.

Fluids sample ports can be provided to permit sampling of both electrolytes, which will allow for the evaluation of parasitic losses due to reactant crossover or side reactions. Electrolytes can be sampled and analyzed with standard techniques.

Ion Conducting Barriers

The ion conducting barrier allows the passage of protons but not a significant amount of the quinone, hydroquinone, or other redox active species. Example ion conducting barriers are Nafion, i.e., sulfonated tetrafluoroethylene based fluoropolymer-copolymer, hydrocarbons, e.g., polyethylene, and size exclusion barriers, e.g., ultrafiltration or dialysis membranes with a molecular weight cut off of 100, 250, 500, or 1,000 Da. For size exclusion membranes, the molecular weight cut off will be determined based on the molecular weight of the quinone, hydroquinone, or other redox active species employed. Porous physical barriers may also be included, when the passage of redox active species other than protons is tolerable.

Additional Components

A battery of the invention may include additional components as is known in the art. Quinones, hydroquinones, and other redox active species dissolved or suspended in aqueous solution will be housed in a suitable reservoir. A battery may further include pumps to pump aqueous solutions or suspensions past one or both electrodes. Alternatively, the electrodes may be placed in a reservoir that is stirred or in which the solution or suspension is recirculated by any other method, e.g., convection, sonication, etc. Batteries may also include graphite flow plates and corrosion-resistant metal current collectors.

Theoretical Techniques

The Harvard Clean Energy Project (CEP) (The Harvard Clean Energy Project, http[[://]]cleanenergy.harvard.edu) is an automated, high-throughput framework for the computational screening and design of new organic photovoltaic materials for solar cells. In the invention, we can employ the existing CEP infrastructure (J. Hachmann, R. Olivares-Amaya, S. Atahan-Evrenk, C. Amador-Bedolla, R. S. Sanchez-Carrera, A. Gold-Parker, L. Vogt, A. M. Brockway, and A. Aspuru-Guzik, J. Phys. Chem. Lett. 2, 2241 (2011)) and use the core components of the CEP machinery to characterize the properties of candidate molecules for the flow batteries. A computational study of the molecules combining the scale and level of first-principles molecular quantum mechanics found in the framework is unprecedented. It stands out from other computational materials science approaches as it combines conventional molecular modeling with strategies from modern drug discovery. It also adopts techniques from cheminformatics, materials informatics, and machine learning to scale the process of developing structure-property relationships and improve existing efficiency models for the flow batteries.

Generation of Molecular Candidate Libraries

A graph-based combinatorial molecule generator can be used to build the screening molecular libraries. Its engine employs a SMILES (simplified molecular input line entry specification) string representation of the molecules, as well as SMARTS (SMILES arbitrary target specification) (D. Weininger, J. Chem. Inf. Comp. Sci. 28, 31 (1988); R. Olivares-Amaya, C. Amador-Bedolla, J. Hachmann, S. Atahan-Evrenk, R. S. Sanchez-Carrera, L. Vogt, and A. Aspuru-Guzik, Energy & Env. Sci. 4, 4849 (2011)). Our library generator can readily produce libraries of organic chemicals by using a different set of fragments and connection patterns. Substituents can be incorporated in a similar fashion. A first library of quinone molecules can be generated based on possible building blocks and bonding rules. This combinatorial library allows for an exhaustive and systematic exploration of quinones.

Ab Initio Quantum Chemical Screening

Molecules can be screened for their redox potential and stability against polymerization or additional side reactions. For screening purposed, we can assume that the electrode chemistry is nearly constant over the family of screened molecules.

Redox Potentials

Figure 3:
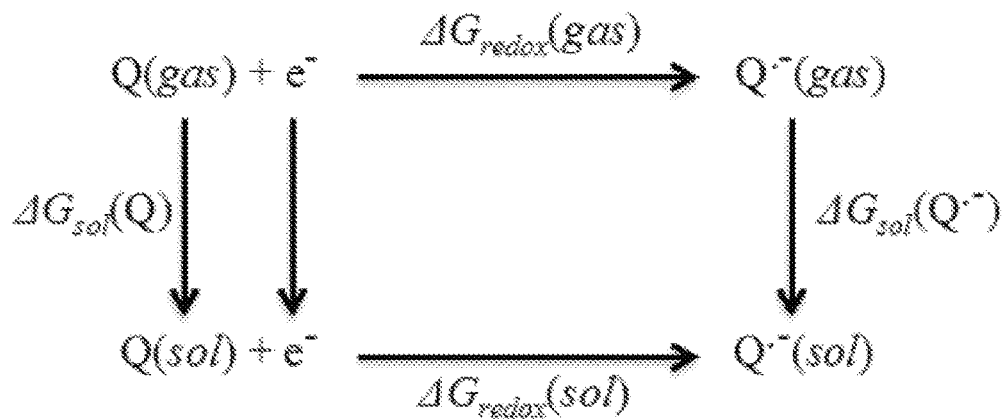
FIG. 3 is a diagram of the thermodynamic reaction cycle to convert the standard Gibbs free energy of the quinone reaction in the gas phase to the standard Gibbs free energy of the quinone reaction in the solution phase.

There are several protocols to predict the redox potentials using Density Functional Theory (DFT) (C. Karlsson, E. Jämstorp, M. Strømme, and M. Sjödin, J. Phys. Chem. C 116, 3793 (2011); X.-Q. Zhu and C.-H. Wang, J. Org. Chem. 75, 5037 (2010); J. Li, C. L. Fisher, J. L. Chen, D. Bashford, and L. Noodleman, Inorg. Chem. 35, 4694 (1996)). One is the Born-Haber cycle as shown in FIG. 3. The overall reaction of quinones in solution can be characterized by the standard Gibbs free energy, $\Delta G_{redox}(\text{sol}) = \Delta G_{redox}(\text{gas}) + \Delta G_{sol}(Q^-) - \Delta G_{sol}(Q)$; the standard one-electron redox potential is then obtained by dividing by Faraday's constant. To estimate the redox potential using the scheme in FIG. 3 we first calculate the electron affinity (EA) of the quinone, which is the difference of the Gibbs free energy between a neutral quinone ($G_{neutral}$) and its corresponding anion ($G_{anion}$) at their respective optimized geometries. Additionally, vibrational frequency calculations will be performed on the optimized structures to obtain the thermal correction terms. Here, theoretical methods prove to be useful because the experimental prediction of these redox potential constituents is difficult. It should be noted that our first calculation level only addresses a subset of the important material issues (G. Heimel, I. Salzmann, S. Duhm, and N. Koch, Chem. Mat. 23, 359 (2011)) and is limited to the inherent accuracy of the model chemistries employed. Several factors add considerable value to these calculations: (a) the computed results are correlated to actual experimental quantities to provide insights into their relationship; (b) the analysis of the aggregated data from a very large number of molecules in combination with structural similarity measures can reveal guiding trends, even if the absolute result for an individual candidate is inaccurate due to a particular limitation of its electronic structure calculation; and (c) employing a variety of different model chemistries compensates for the chance of a failure in any particular method. This ensures a composite scoring with many contributions instead of relying on any single level of theory. The redox characteristics of quinones make them an interesting class of compounds in chemistry and biology. Despite their importance in electron transfer reactions, there is a scarce knowledge of quinone electrochemistry. It is a challenging task to study short-lived quinone anions in laboratory conditions, and the existing theoretical work is limited to a small number of known quinone compounds (C. Karlsson, E. Jamstorp, M. Strømme, and M. Sjödin, J. Phys. Chem. C 116, 3793 (2011); X.-Q. Zhu and C.-H. Wang, J. Org. Chem. 75, 5037 (2010); C. A. Reynolds, P. M. King, and W. G. Richards, Nature 334, 80 (1988); R. A. Wheeler, J. Am. Chem. Soc. 116, 11048 (1994); K. S. Raymond, A. K. Grafton, and R. A. Wheeler, J. Phys. Chem. B 101, 623 (1997); M. Namazian, J. Mol. Struc.-Theochem. 664, 273 (2003); M. Namazian and H. A. Almodarresieh, J. Mol. Struc.-Theochem. 686, 97 (2004); M. Namazian, H. A. Almodarresieh, M. R. Noorbala, and H. R. Zare, Chem. Phys. Lett. 396, 424 (2004); M. Namazian and M. L. Coote, J. Phys. Chem. A 111, 7227 (2007); K. M. Rosso, D. M. A. Smith, Z. Wang, C. C. Ainsworth, and J. K. Fredrickson, J. Phys. Chem. A 108, 3292 (2004). A systematic study on the prediction of quinone redox potentials in aqueous solutions or in other solvents is therefore highly desirable. In quantum chemical screening, we address the thermodynamic stability of quinone-derived compounds with different functional groups in different solvents and the effects of molecular substituents on their electron reduction potentials in these environments. The fundamental nature of our studies would expand our understanding of the reduction mechanisms of quinones in solutions, and provide us important clues on the creative design rules for new quinones with possibly better oxidizing properties. The scale of the one-electron reduction potentials found in a computational study (X.-Q. Zhu and C.-H. Wang, *J. Org. Chem.* 75, 5037 (2010)) of 116 quinones in dimethyl sulfoxide suggests that there is significant room for improvement in the oxidizing properties of quinones. It is, however, difficult to establish the quinone electrochemistry completely, because the possibility of proton transfers coupled to all redox reactions should be considered both in gas and solution phases. We can investigate electrochemical reactions of a large number of quinone derived compounds by including all possible proton and electron transfers at different levels of oxidation and protonation that are available to the species of interest.

Stability Against Polymerization and Side Reactions

For the candidate structures that have the right redox potential ranges, we can carry out bond-dissociation energy studies for the hydrogen atoms bonded to the aromatic rings. This allows us to estimate the stability of the predicted quinone. Replacement of the substituent with groups that may affect the redox potential, such as alkyl groups (e.g., methyl, ethyl, isopropyl groups), or groups to increase solubility, can be carried out. Cheminformatics packages such as ChemAxon (N. T. Hansen, I. Kouskoumvekaki, F. S. Jørgensen, S. Brunak, and S. Ó. Jónsdóttir, *J. Chem. Inform. and Mod.* 46, 2601 (2006); M. Hewitt, M. T. D. Cronin, S. J. Enoch, J. C. Madden, D. W. Roberts, and J. C. Dearden, *J. Chem. Inform. and Mod.* 49, 2572 (2009)) can be employed to estimate aqueous solubility. Besides having redox potential in a desirable range and stability against clustering, the ideal compounds are the ones that are highly soluble in their electrolyte solutions and are durable even after many cycles of charging and discharging. Such compounds can provide efficient and affordable flow batteries. The high-throughput computational studies have proven their use on finding novel materials for efficient organic photovoltaic applications R. Olivares-Amaya, C. Amador-Bedolla, J. Hachmann, S. Atahan-Evrenk, R. S. Sanchez-Carrera, L. Vogt, and A. Aspuru-Guzik, *Energy & Env. Sci.* 4, 4849 (2011); A. N. Sokolov, S. Atahan-Evrenk, R. Mondal, H. B. Akkerman, R. S. Sanchez-Carrera, S. Granados-Focil, J. Schrier, S. C. B. Mannsfeld, A. P. Zoombelt, Z. Bao, and A. Aspuru-Guzik, *Nat. Comm.* 2, 437 (2011); G. Giri, E. Verploegen, S. C. B. Mannsfeld, S. Atahan-Evrenk, D. H. Kim, S. Y. Lee, H. A. Becerril, A. Aspuru-Guzik, M. F. Toney, and Z. Bao, *Nature* 480, 504 (2011)). A wide range of electronic properties are found in the chemical library of CEP, which aims to develop efficient organic solar cells. The total number of DFT calculations performed in CEP currently stands at 85 million. Analyses of these data reveal that only a small fraction of the screened compounds have the energetic levels necessary for highly efficient organic photovoltaic cells. This underscores the importance of carefully selecting the compounds to be synthesized and tested, and at the same time the value that fast theoretical characterization and extensive search can provide toward this task. An unaided search has only a small chance of success, whereas a guided hierarchal search can predict a significant number of suitable structures.

EXAMPLES

Example 1

Theoretical Study of Modified AQDS Structures

Chemical structure modifications to the anthraquinone backbone can be made to further lower $E^0$, thereby raising the cell voltage. One way to do this is by attaching to the aromatic ring electron-donating groups such as hydroxy (—OH), which make the quinone less electrophilic (Y. Song and G. R. Buettner, *Free Radical Biology and Medicine* 49, 919 (2010)). Hydroxy-substituted anthraquinones are natural products that have been extracted for millennia from common sources such as rhubarb. This could even provide a renewable source for future anthraquinone-based electrolyte solutions.

Quantum chemical calculations of un-substituted and hydroxy-substituted AQDS were performed to predict how substitution patterns would change both $E^0$ of the quinone/hydroquinone couples and $G^0_{solv}$ in aqueous solution. The hydroxy group was systematically substituted for hydrogen on AQDS (Scheme 1).

SCHEME 1

AQDS screened by theoretical calculations.

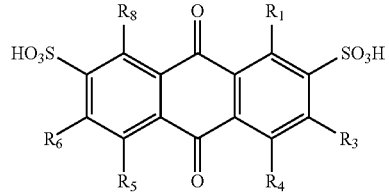

| ID | —OH substituted | $R_1$ | $R_3$ | $R_4$ | $R_5$ | $R_6$ | $R_8$ | $E^0$ (V) | $G^0_{solv}$ (kJ mol$^{-1}$) |
|---|---|---|---|---|---|---|---|---|---|
| 1 | Non- | H | H | H | H | H | H | 0.222 | -81.5 |
| 2 | Mono- | OH | H | H | H | H | H | 0.185 | -81.5 |
| 3 | | H | OH | H | H | H | H | 0.325 | -111.7 |
| 4 | | H | H | OH | H | H | H | 0.108 | -88.2 |
| 5 | Di- | OH | OH | H | H | H | H | 0.176 | -110.3 |
| 6 | | OH | H | OH | H | H | H | 0.027 | -85.6 |
| 7 | | OH | H | H | OH | H | H | 0.122 | -96.7 |
| 8 | | OH | H | H | H | OH | H | 0.143 | -85.7 |
| 9 | | OH | H | H | H | H | OH | 0.101 | -83.2 |
| 10 | | H | OH | OH | H | H | H | 0.153 | -105.4 |
| 11 | | H | OH | H | OH | H | H | 0.179 | -119.1 |
| 12 | | H | OH | H | H | OH | H | 0.202 | -112.0 |
| 13 | | H | H | OH | OH | H | H | 0.000 | -95.6 |
| 14 | Tri- | OH | OH | OH | H | H | H | -0.070 | -101.7 |
| 15 | | OH | OH | H | OH | H | H | 0.083 | -116.2 |
| 16 | | OH | OH | H | H | OH | H | 0.187 | -114.3 |
| 17 | | OH | OH | H | H | H | OH | 0.310 | -120.9 |
| 18 | | OH | H | OH | OH | H | H | -0.102 | -91.4 |
| 19 | | OH | H | OH | H | OH | H | 0.089 | -114.0 |
| 20 | | OH | H | OH | H | H | OH | -0.085 | -87.1 |
| 21 | | OH | H | H | OH | OH | H | -0.048 | -102.8 |
| 22 | | H | OH | OH | OH | H | H | -0.107 | -107.8 |
| 23 | | H | OH | OH | H | OH | H | 0.106 | -136.8 |
| 24 | Tetra- | OH | OH | OH | OH | H | H | -0.098 | -109.0 |
| 25 | | OH | OH | OH | H | OH | H | 0.012 | -108.4 |
| 26 | | OH | OH | OH | H | H | OH | -0.222 | -102.3 |
| 27 | | OH | OH | H | OH | OH | H | -0.019 | -132.3 |
| 28 | | OH | OH | H | OH | H | OH | 0.046 | -114.6 |
| 29 | | OH | OH | H | H | OH | OH | 0.080 | -111.1 |
| 30 | | OH | H | OH | OH | OH | H | -0.259 | -99.0 |
| 31 | | OH | H | OH | OH | H | OH | -0.199 | -91.9 |
| 32 | | H | OH | OH | OH | OH | H | -0.083 | -120.6 |

SCHEME 1-continued

AQDS screened by theoretical calculations.

| ID | —OH substituted | $R_1$ | $R_3$ | $R_4$ | $R_5$ | $R_6$ | $R_8$ | $E^0$ (V) | $G^0_{solv}$ (kJ mol$^{-1}$) |
|---|---|---|---|---|---|---|---|---|---|
| 33 | Penta- | OH | OH | OH | OH | OH | H | -0.252 | -117.1 |
| 34 | | OH | OH | OH | OH | H | OH | -0.292 | -108.3 |
| 35 | | OH | OH | OH | H | OH | OH | -0.030 | -111.6 |
| 36 | Hexa- | OH | OH | OH | OH | OH | OH | -0.077 | -121.0 |

Figure 4:
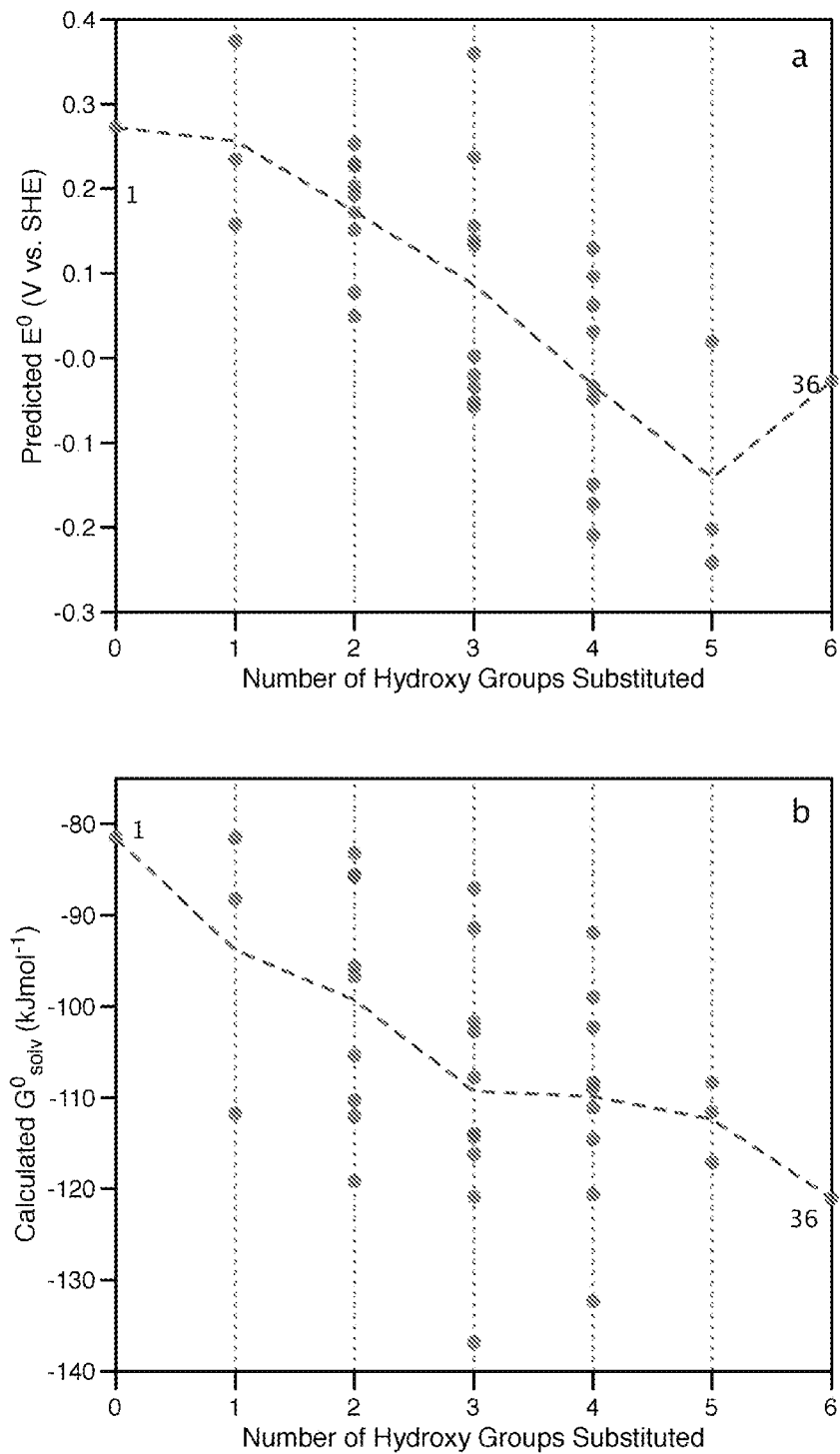
FIG. 4 shows the effect of substituted —OH groups on the (a) E$^0$ and (b) G$^0_{solv}$ for 2,7-AQDS. The lines represent the average value of E$^0$ or G$^0_{solv}$ for each number of —OH groups substituted.

$E^0$ and $G^0_{solv}$ become more negative by increasing the number of —OH groups substituted for hydrogen on AQDS (FIG. 4). Thus, OH-substituted anthraquinones provide a wide window for tuning $E^0$ from +0.33 V to -0.29 V vs. SHE (FIG. 4a). The negative mean shift in $E^0$ per hydroxy group is -50 mV. In addition, increasing numbers of hydroxy substituents raise the aqueous solubility due to hydrogen bonding (FIG. 4b).

Theory Methods

We used a fast and robust theoretical approach to determine the $E^0$ of quinone/hydroquinone couples in aqueous solutions. We employed an empirical linear correlation of $\Delta H_f$, the heat of formation of hydroquinone at 0 K from the quinone and the hydrogen gas, to the measured $E^0$ values (Dewar, M. J. S. and Trinajstic, N. Ground States of Conjugated Molecules-XIV: Redox Potentials of Quinones. *Tetrahedron*, 25, 4529-4534 (1969)). The entropy contributions to the total free energies of reaction have been neglected because the entropies of reduction of quinones are found to be very similar (Dewar, M. J. S. and Trinajstic, N. Ground States of Conjugated Molecules-XIV: Redox Potentials of Quinones. *Tetrahedron*, 25, 4529-4534 (1969); Pullman, B. and Pullman, A. Quantum Biochemistry, p475, Interscience Publishers: New York (1963)). It was also assumed that the reduction of quinones takes place with a single step reaction involving a two-electron two-proton process (Guin, P. S., Das, S., and Mandal, P. C. Electrochemical reduction of quinones in different media: a review. *International Journal of Electrochemistry*, 816202 (2011)). The total free energies of molecules were obtained from first-principles quantum chemical calculations within density functional theory (DFT) at the level of generalized gradient approximation (GGA) using the PBE functional (Perdew, J. P., Burke, K., and Ernzerhof, M. Generalized Gradient Approximation Made Simple. *Phys. Rev. Lett.*, 77, 3865-3868 (1996)). The projector augmented wave (PAW) technique and a plane-wave basis set (Blochl, P. E. Projector Augmented-Wave Method. *Phys. Rev. B*, 50, 17953-17979 (1994); Kresse, G., Joubert, D. From Ultrasoft Pseudopotentials to the Projector Augmented-Wave Method. *Phys. Rev. B*, 59, 1758-1775 (1999)) as implemented in VASP (Kresse, G., Hafner, J. Ab Initio Molecular Dynamics for Liquid Metals. Phys. Rev. B, 47, 558-561 (1993); Kresse, G., Furthmuller, J. Efficient Iterative Schemes for Ab Initio Total-Energy Calculations Using a Plane-Wave Basis Set. *Phys. Rev. B*, 54, 11169-11186 (1996)) were employed. The kinetic energy cutoff for the plane-wave basis was set at 500 eV, which was sufficient to converge the total energies on a scale of 1 meV/atom. To obtain the ground-state structures of molecules in the gas phase, we considered multiple initial configurations for each molecule and optimized them in a cubic box of 25 Å and a Γ-point sampling. The geometries were optimized without any symmetry constraints using the conjugate gradient (CG) algorithm, and the convergence was assumed to be complete when the total remaining forces on the atoms were less than 0.01 eV/Å.

Figure 5:
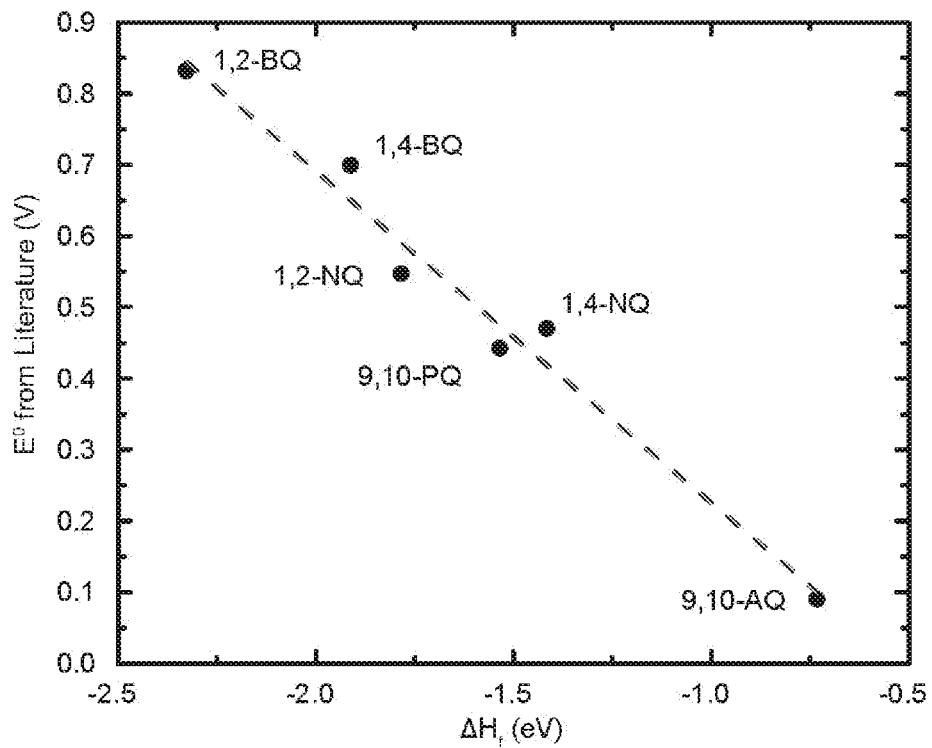
FIG. 5 is a graph of a calibration model showing a linear relationship (R$^2$=0.975) between calculated ΔH$_f$ and experimental E$^0$ of six quinones in aqueous solutions where BQ: benzoquinone, NQ: naphthoquinone, AQ: anthraquinone, and PQ: phenanthrene.

We employed the experimental values of aqueous $E^0$ and computed $\Delta H_f$ of two benzoquinones of 1,2- and 1,4-, two naphthoquinones of 1,2- and 1,4-, 9,10-anthraquinone, and 9,10-phenanthrene (Johnsson Wass, J. R. T., Ahlberg, E., Panas, I., and Schiffrin, D. J., Quantum Chemical Modeling of the Reduction of Quinones. *J. Phys. Chem. A*, 110, 2005-2020 (2006)). The developed linear calibration model for $E^0$ yields an $R^2$=0.975 between the calculated $\Delta H_f$ and $E^0$ (FIG. 5).

The $G^0_{solv}$ of the quinones in water were calculated using the Jaguar 8.0 program in the Schrödinger suite 2012 (Jaguar, version 8.0, Schrödinger, LLC, New York, N.Y., 2011). The standard Poisson-Boltzmann solver was employed (Tannor, D. J. et al. Accurate First Principles Calculation of Molecular Charge Distributions and Solvation Energies from Ab Initio Quantum Mechanics and Continuum Dielectric Theory. *J. Am. Chem. Soc.*, 116, 11875-11882 (1994); Marten, B. et al. New Model for Calculation of Solvation Free Energies: Correction of Self-Consistent Reaction Field Continuum Dielectric Theory for Short-Range Hydrogen-Bonding Effects. *J. Phys. Chem.*, 100, 11775-11788 (1996)). In this model, a layer of charges on the molecular surface represents the solvent. $G^0_{solv}$ was calculated as the difference between the total energy of the solvated structure and the total energy of the molecule in vacuum. A more negative value for $G^0_{solv}$ corresponds to a quinone that is likely to have a higher aqueous solubility. An absolute prediction of the solubility is not readily available, as the accurate prediction of the most stable forms of molecular crystal structures with DFT remains an open problem (Hongo, K., Watson, M. A., Sanchez-Carrera, R. S., Iitaka, T., and Aspuru-Guzik, A. Failure of Conventional Density Functionals for the Prediction of Molecular Crystal Polymorphism: A Quantum Monte Carlo Study. *J. Phys. Chem. Lett.*, 1, 1789-1794 (2010)).

Example 2

A solution of 1,4-dihydroxy-9,10-anthraquinone-3-sulfonic acid

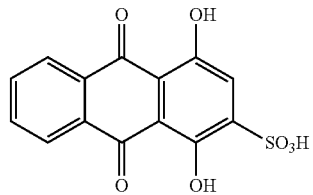 [SMILES: O=C1c2ccccc2C(=O)c2c(O)c(S(=O)(=O)O)cc(O)c21]

Figure 6:
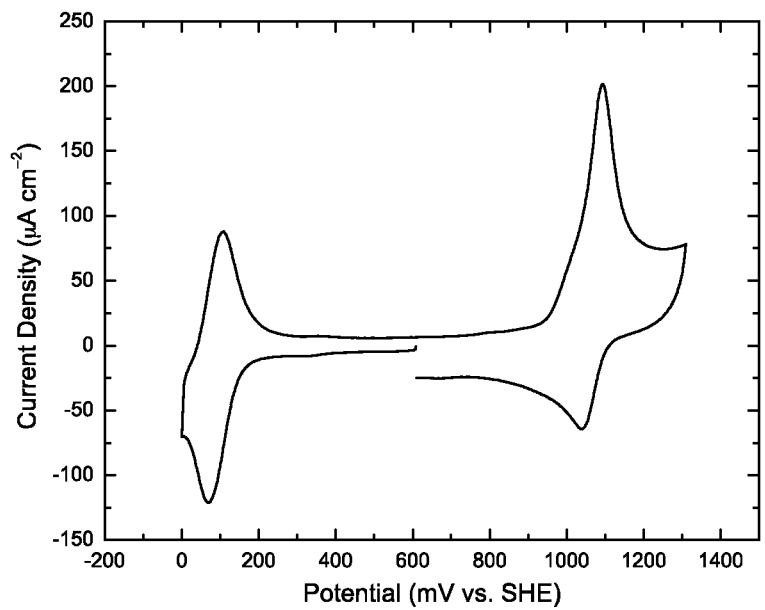
FIG. 6 is the cyclic voltammetry (CV) curve for 1,4-dihydroxy-9,10-anthraquinone-3-sulfonic acid.

(concentration about 1 mM in 1M sulfuric acid in water) was studied by cyclic voltammetry (CV). The CV curve for this compound in FIG. 6 shows 2 sets of nearly reversible redox peaks located near 0.11 V and 1.08 V.

Example 3

A solution of 1,2-dihydroxy-9,10-anthraquinone-3-sulfonic acid

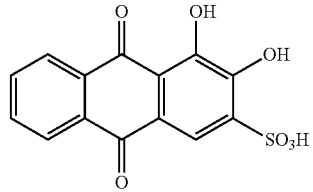 [SMILES: O=C1c2ccccc2C(=O)c2c1cc(S(=O)(=O)O)c(O)c2O]

Figure 7:
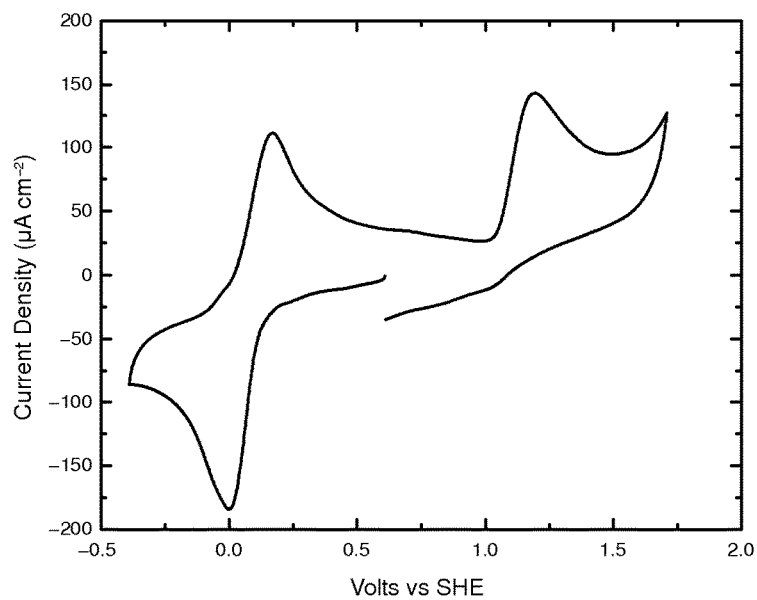
FIG. 7 is the CV curve for 1,2-dihydroxy-9,10-anthraquinone-3-sulfonic acid.

(concentration about 1 mM in 1M sulfuric acid in water) was studied by CV. The CV curve for this compound in FIG. 7 shows 2 sets of redox peaks located near 0.10 V and 1.3 V.

Example 4

A solution containing both 1,2,4-trihydroxy-9,10-anthraquinone-3,6-disulfonic acid

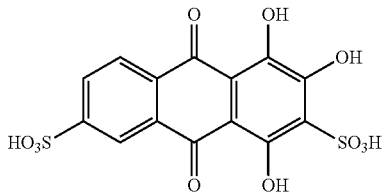 [SMILES: O=C1c2ccc(S(=O)(=O)O)cc2C(=O)c2c(O)c(S(=O)(=O)O)c(O)c(O)c21]

and 1,2,4-trihydroxy-9,10-anthraquinone-3,7-disulfonic acid

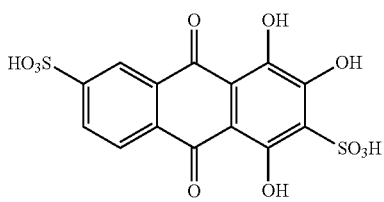 [SMILES: O=C1c2cc(S(=O)(=O)O)ccc2C(=O)c2c(O)c(S(=O)(=O)O)c(O)c(O)c21]

(concentration about 1 mM in 1M sulfuric acid in water) was studied by CV.

Figure 8:
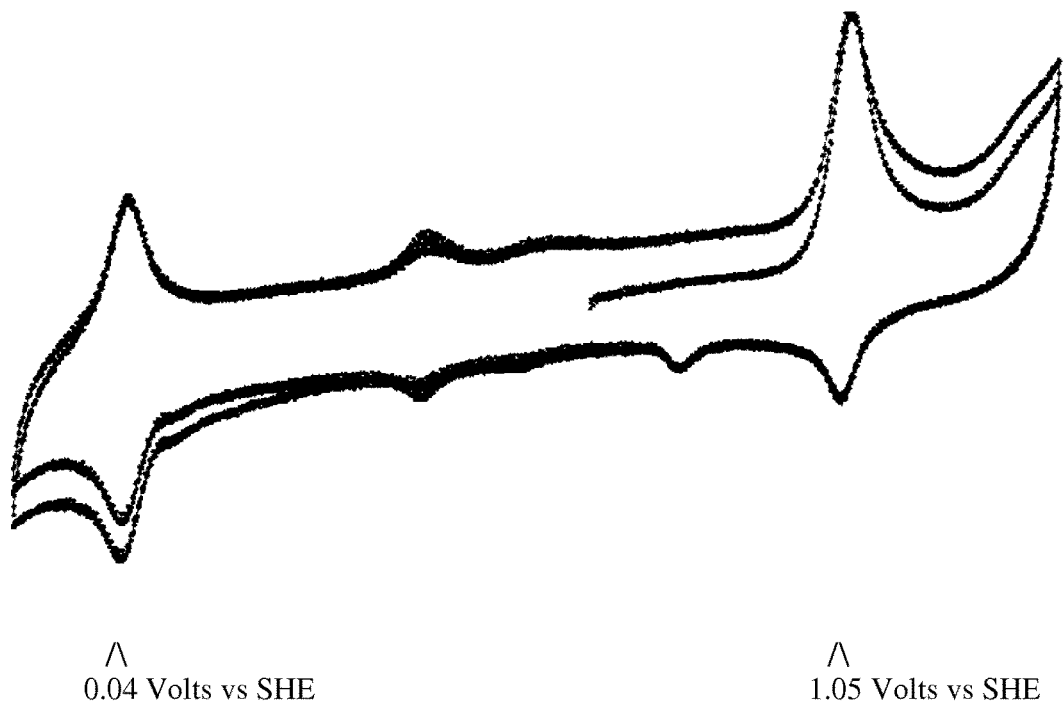
FIG. 8 is a CV curve for the mixture of 1,2,4-trihydroxy-9,10-anthraquinone-3,6-disulfonic acid and 1,2,4-trihydroxy-9,10-anthraquinone-3,7-disulfonic acid.

The CV curve for this mixture in FIG. 8 shows major redox events near 0.04 V and 1.05 V vs. SHE.

Example 5

A rechargeable flow battery was constructed using a 0.1 M water solution of a mixture of the isomers 1,2-dihydroxy-9,10-anthraquinone-3,6-disulfonic acid

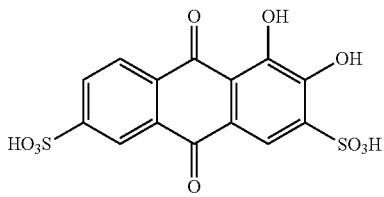 [SMILES: O=C1c2cc(S(=O)(=O)O)ccc2C(=O)c2c1cc(S(=O)(=O)O)c(O)c2O]

and 1,2-dihydroxy-9,10-anthraquinone-3,7-disulfonic acid

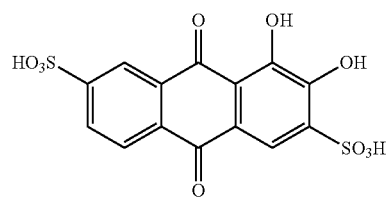 [SMILES: O=C1c2ccc(S(=O)(=O)O)cc2C(=O)c2c1cc(S(=O)(=O)O)c(O)c2O]

on both sides of the cell.

Figure 9:
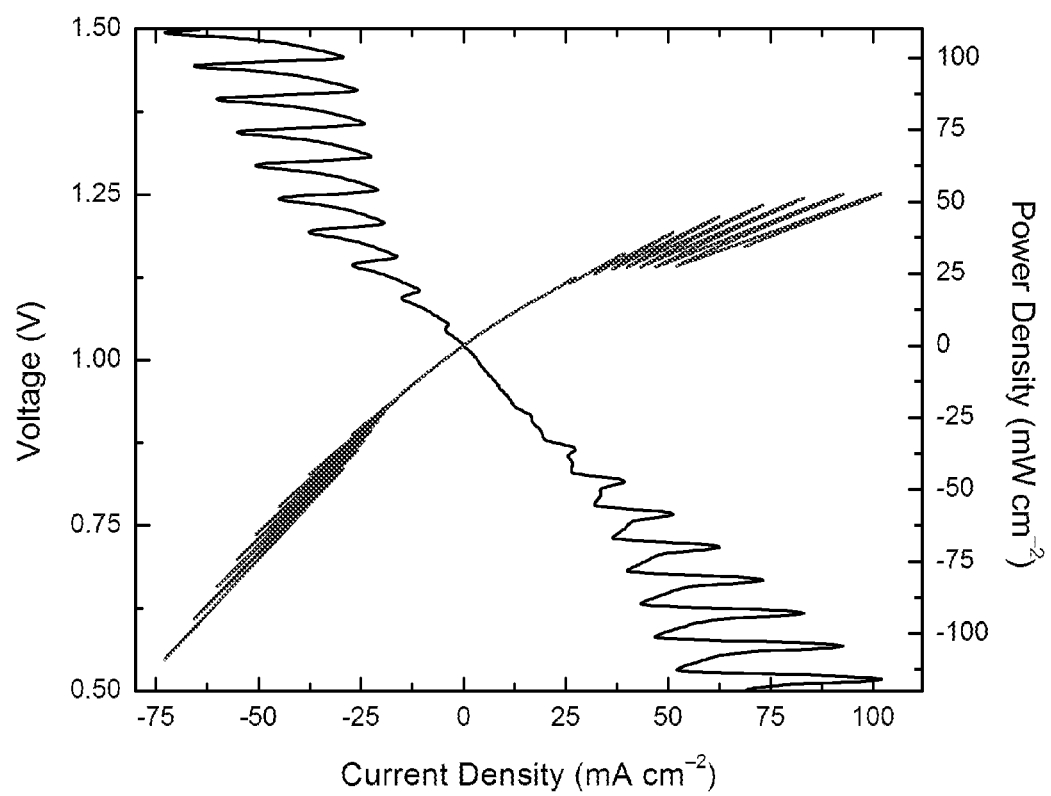
FIG. 9 is graph of voltage and power density as functions of current density of a rechargeable flow battery that was constructed using a 0.1 M water solution of a mixture of the isomers 1,2-dihydroxy-9,10-anthraquinone-3,6-disulfonic acid and 1,2-dihydroxy-9,10-anthraquinone-3,7-disulfonic acid.

The voltage and power density of this battery are shown in FIG. 9 as a function of current density. The open circuit potential is 1.02 V, and the peak power density is 50 mA cm$^{-2}$. The coulombic efficiency is over 99%. The peak power density is limited by the relatively low concentration of the solution, which increases the cell resistance. Increasing the concentration of the redox-active quinones in the solution is expected to increase the power density.

It is believed that during the first few cycles of the operation of this battery, the compounds put into the battery, 1,2-dihydroxy-9,10-anthraquinone-3,6-disulfonic acid and 1,2-dihydroxy-9,10-anthraquinone-3,7-disulfonic acid, are irreversibly hydroxylated to form 1,2,4-trihydroxy-9,10-anthraquinone-3,6-disulfonic acid and 1,2,4-trihydroxy-9,10-anthraquinone-3,7-disulfonic acid; these then may protonate and deprotonate reversibly to provide the quinone/hydroquinone couple.

Example 6

A water solution of 2,2'-((1,4-dihydroxy-9,10-dioxo-9,10-dihydroanthracene-2,3-diyl)bis(sulfanediyl))bis(ethane-1-sulfonic acid)

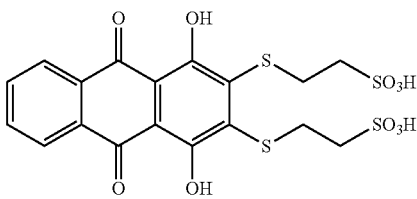 [SMILES: O=C1c2ccccc2C(=O)c2c(O)c(SCCS(=O)(=O)O)c(SCCS(=O)(=O)O)c(O)c21]

Figure 10:
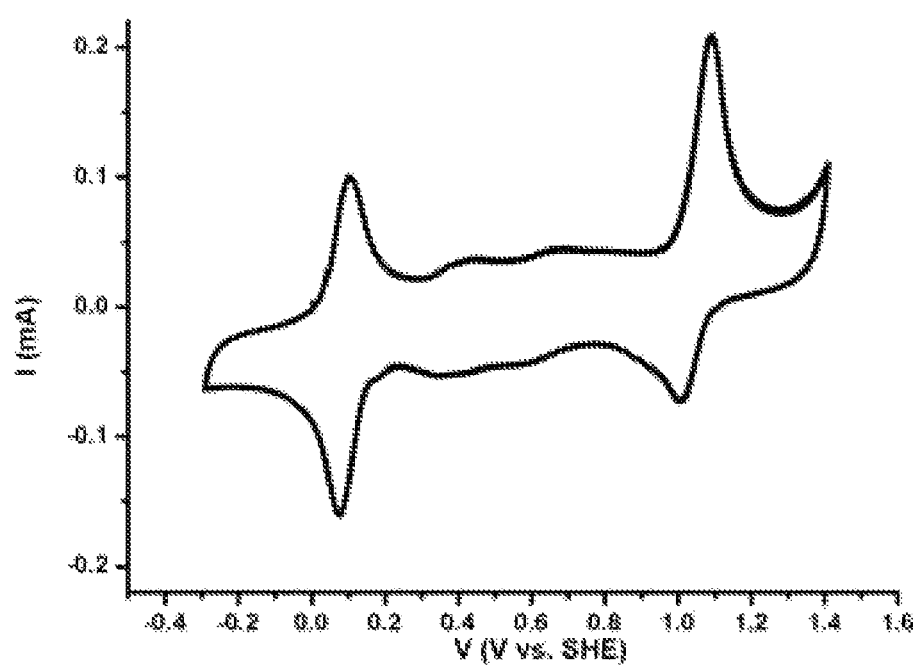
FIG. 10 is a CV curve for 2,2'-((1,4-dihydroxy-9,10-dioxo-9,10-dihydroanthracene-2,3-diyl)bis(sulfanediyl))bis(ethane-1-sulfonic acid).

(concentration about 1 mM in 1M sulfuric acid in water) was studied by CV. The CV curve for this compound in FIG. 10 shows 2 sets of nearly reversible redox peaks located near 0.11 V and 1.08 V. It is believed that these peaks correspond to the redox reactions

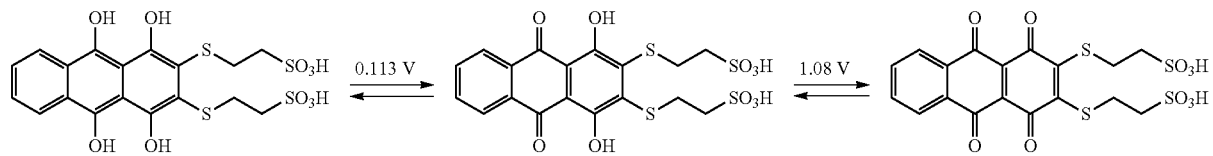 [SMILES: O=S(=O)(O)CCSc1c(SCCS(=O)(=O)O)c(O)c2c(O)c3ccccc3c(O)c2c1O ; O=C1c2ccccc2C(=O)c2c(O)c(SCCS(=O)(=O)O)c(SCCS(=O)(=O)O)c(O)c21 ; O=c1c(SCCS(=O)(=O)O)c(SCCS(=O)(=O)O)c(=O)c2c(=O)c3ccccc3c(=O)c1=2]

When used as a single quinone on both sides of a flow battery, it is expected to operate at an open circuit voltage of nearly 1 V.

Example 7

A scheme for a quinone having four oxidation states is shown below:

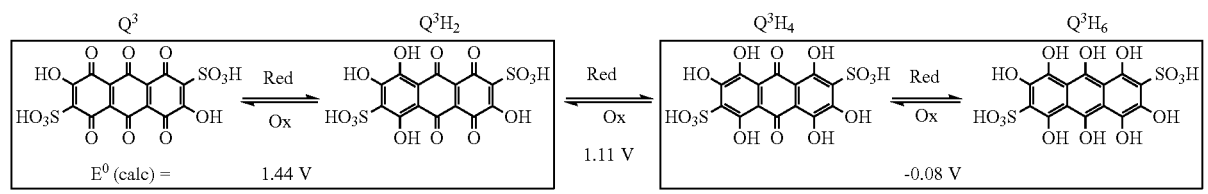

In this scheme, during discharge, the fully oxidized form $Q^3$ is reduced to $Q^3H_2$, and the fully reduced form $Q^3H_6$ is oxidized to $Q^3H_4$. In this embodiment, the two sides of the cell do not share an oxidation state during charging or discharge.

Other embodiments are in the claims.

What is claimed is:

1. A rechargeable battery comprising first and second electrodes, wherein in its charged state, the battery comprises an oxidized form of a quinone having three or more oxidation states dissolved or suspended in aqueous solution in contact with the first electrode and a reduced form of the quinone having three or more oxidation states dissolved or suspended in aqueous solution in contact with the second electrode, wherein during discharge the oxidized form of the quinone is reduced at the first electrode and the reduced form of the quinone is oxidized at the second electrode.

2. The rechargeable battery of claim 1, wherein the quinone is a water-soluble anthraquinone.

3. The rechargeable battery of claim 1, wherein the first and second electrodes are separated by an ion conducting barrier.

4. The rechargeable battery of claim 3, wherein the barrier is a porous physical barrier or a size exclusion barrier.

5. The rechargeable battery of claim 1, wherein the quinone is of the formula:

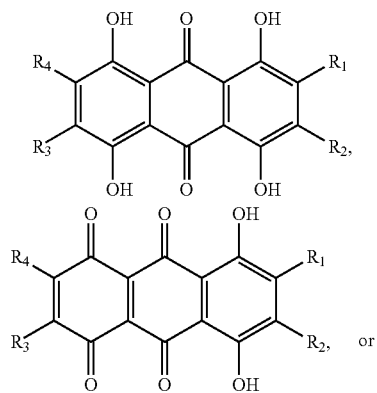

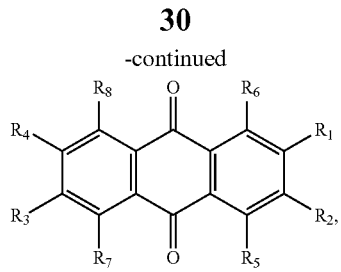

wherein each of $R_1$-$R_8$ is independently selected from H, optionally substituted $C_{1-6}$ alkyl, halo, hydroxy, optionally substituted $C_{1-6}$ alkoxy, $SO_3H$, amino, nitro, carboxyl, phosphoryl, phosphonyl, thiol, carboxyl, optionally substituted $C_{1-6}$ alkyl ester, optionally substituted $C_{1-6}$ alkyl thio, and oxo, or an ion thereof.

6. The rechargeable battery of claim 1, wherein the quinone is selected from the group consisting of:

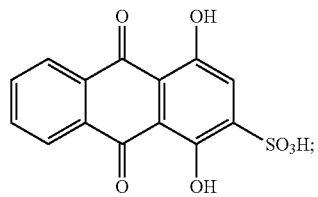

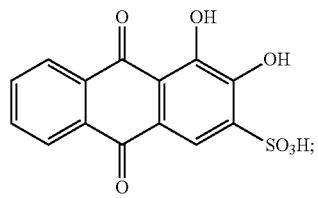

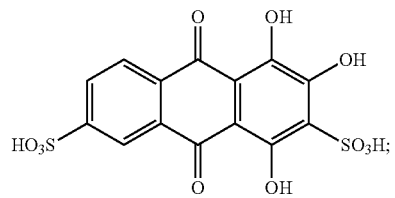

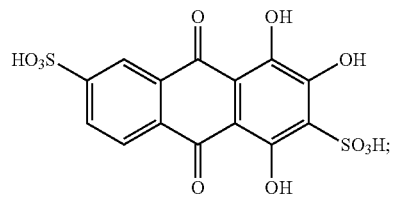

-continued

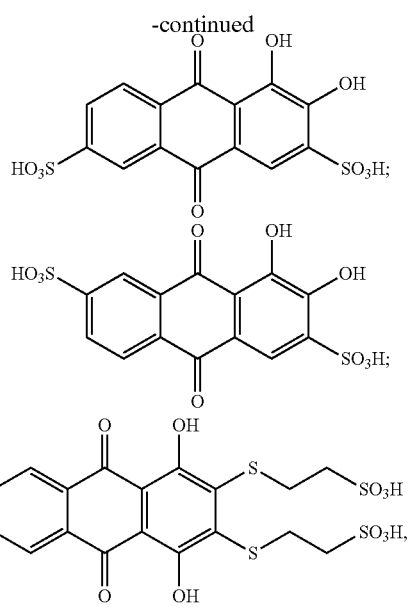

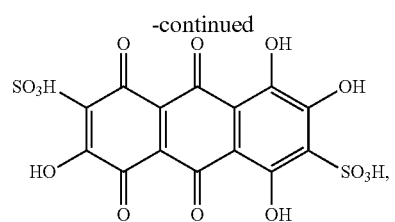

or an ion thereof.

7. The rechargeable battery of claim 1, further comprising reservoirs for the oxidized and reduced forms of the quinone dissolved or suspended in aqueous solution and a mechanism to circulate the solutions.

8. A method for storing electrical energy comprising applying a voltage across the first and second electrodes and charging a battery of claim 1.

9. A method for providing electrical energy by connecting a load to the first and second electrodes and allowing a battery of claim 1 to discharge.

* * * * *